United States Patent
Unrau et al.

(10) Patent No.: US 10,829,642 B2
(45) Date of Patent: Nov. 10, 2020

(54) METHOD FOR PRODUCING CARBON BLACK USING AN EXTENDER FLUID

(71) Applicant: CABOT CORPORATION, Boston, MA (US)

(72) Inventors: Chad J. Unrau, Amarillo, TX (US); David O. Hunt, Nashua, NH (US); David M. Matheu, Somerville, MA (US); Serguei Nester, Tyngsboro, MA (US)

(73) Assignee: CABOT CORPORATION, Boston, MA (US)

( * ) Notice: Subject to any disclaimer, the term of this patent is extended or adjusted under 35 U.S.C. 154(b) by 415 days.

(21) Appl. No.: 14/767,918

(22) PCT Filed: Feb. 26, 2014

(86) PCT No.: PCT/US2014/018545
§ 371 (c)(1),
(2) Date: Aug. 14, 2015

(87) PCT Pub. No.: WO2014/149455
PCT Pub. Date: Sep. 25, 2014

(65) Prior Publication Data
US 2016/0002470 A1    Jan. 7, 2016

Related U.S. Application Data

(60) Provisional application No. 61/789,669, filed on Mar. 15, 2013.

(51) Int. Cl.
*C09C 1/50* (2006.01)
*C09C 1/46* (2006.01)

(52) U.S. Cl.
CPC .................. *C09C 1/50* (2013.01); *C09C 1/46* (2013.01); *C01P 2006/12* (2013.01); *C01P 2006/19* (2013.01); *C01P 2006/60* (2013.01)

(58) Field of Classification Search
CPC ...................................................... C09C 1/50
See application file for complete search history.

(56) References Cited

U.S. PATENT DOCUMENTS

| | | | |
|---|---|---|---|
| 3,288,696 | A | 11/1966 | Orbach |
| 3,409,406 | A | 11/1968 | Murray |
| 3,922,335 | A | 11/1975 | Jordan et al. |
| 4,101,639 | A | 7/1978 | Surovikin et al. |

(Continued)

FOREIGN PATENT DOCUMENTS

| | | |
|---|---|---|
| CN | 101688071 A | 3/2010 |
| EP | 1123736 A1 | 8/2001 |

(Continued)

OTHER PUBLICATIONS

English translation of First Office Action received in corresponding Chinese Patent Application No. 201480017732.X dated Jun. 23, 2016 (13 pages).

(Continued)

*Primary Examiner* — Stuart L Hendrickson

(57) ABSTRACT

Methods for the production of carbon black using an extender fluid(s) are provided as well as methods to control one or more particle properties of carbon black utilizing extender fluids and other techniques.

22 Claims, 6 Drawing Sheets

(56) References Cited

U.S. PATENT DOCUMENTS

| | | | | |
|---|---|---|---|---|
| 4,134,966 | A | * | 1/1979 | Austin .................. C09C 1/50 |
| | | | | 422/158 |
| 4,321,248 | A | * | 3/1982 | Cheng .................. C09C 1/50 |
| | | | | 423/450 |
| 4,383,973 | A | | 5/1983 | Cheng |
| 4,391,789 | A | | 7/1983 | Estopinal |
| 4,439,400 | A | | 3/1984 | Cheng et al. |
| 4,460,558 | A | | 7/1984 | Johnson |
| 4,585,644 | A | * | 4/1986 | Divis .................. B01J 4/001 |
| | | | | 422/150 |
| 4,631,180 | A | | 12/1986 | Yoshimura et al. |
| 4,725,424 | A | | 2/1988 | Tanaka et al. |
| 4,879,104 | A | | 11/1989 | List et al. |
| 5,190,739 | A | | 3/1993 | MacKay et al. |
| 5,486,674 | A | | 1/1996 | Lynum et al. |
| 5,643,344 | A | * | 7/1997 | Strock .................. B01D 53/80 |
| | | | | 422/176 |
| 5,877,250 | A | | 3/1999 | Sant |
| 5,904,762 | A | | 5/1999 | Mahmud et al. |
| 6,153,684 | A | | 11/2000 | Shieh et al. |
| 6,156,837 | A | | 12/2000 | Branan, Jr. et al. |
| 6,348,181 | B1 | | 2/2002 | Morgan |
| 6,391,274 | B1 | | 5/2002 | Vogler et al. |
| 6,403,695 | B1 | | 6/2002 | Soeda et al. |
| 6,485,693 | B1 | | 11/2002 | Morgan |
| 6,926,877 | B2 | | 8/2005 | Green |
| 2002/0090325 | A1 | | 7/2002 | Hasegawa et al. |
| 2004/0213728 | A1 | | 10/2004 | Kopietz et al. |
| 2008/0269379 | A1 | | 10/2008 | Belmont et al. |

FOREIGN PATENT DOCUMENTS

| | | | |
|---|---|---|---|
| GB | 507516 | | 6/1939 |
| GB | 2066228 | A | 7/1981 |
| JP | 4-264165 | A | 9/1992 |
| JP | 7-133439 | A | 5/1995 |
| PL | 30035 | B | 9/1941 |
| PL | 57818 | | 6/1969 |
| PL | 198902 | B1 | 7/2008 |
| SU | 1118291 | A3 | 10/1984 |
| WO | 9845361 | A1 | 10/1998 |
| WO | 9964522 | A1 | 12/1999 |
| WO | 2011103015 | A2 | 8/2011 |

OTHER PUBLICATIONS

International Search Report and Written Opinion issued in corresponding International Patent Application No. PCT/US2014/018545 dated Jun. 20, 2014 (11 pages).

Hungarian Search Report issued in corresponding Hungarian Patent Application No. P1500427 dated Jan. 4, 2016 (1 page).

Office Action received in corresponding Russian Patent Application No. 2015144037/05(067839) dated Oct. 12, 2016 with English translation (15 pages).

Search Report and Written Opinion received in corresponding Netherlands Patent Application No. 2014716 dated Feb. 22, 2016 (7 pages).

Japanese Office Action dated Nov. 1, 2016 received in corresponding Japanese Patent Application No. 2016-500404 (in Japanese with English translation attached) (9 pages).

Search Report—Patent Office of the Republic of Poland of Polish Application No. P414977, dated Jun. 22, 2016.

English translation of Second Office Action received in corresponding Chinese Patent Application No. 201480017732.X dated Feb. 15, 2017 (6 pages).

* cited by examiner

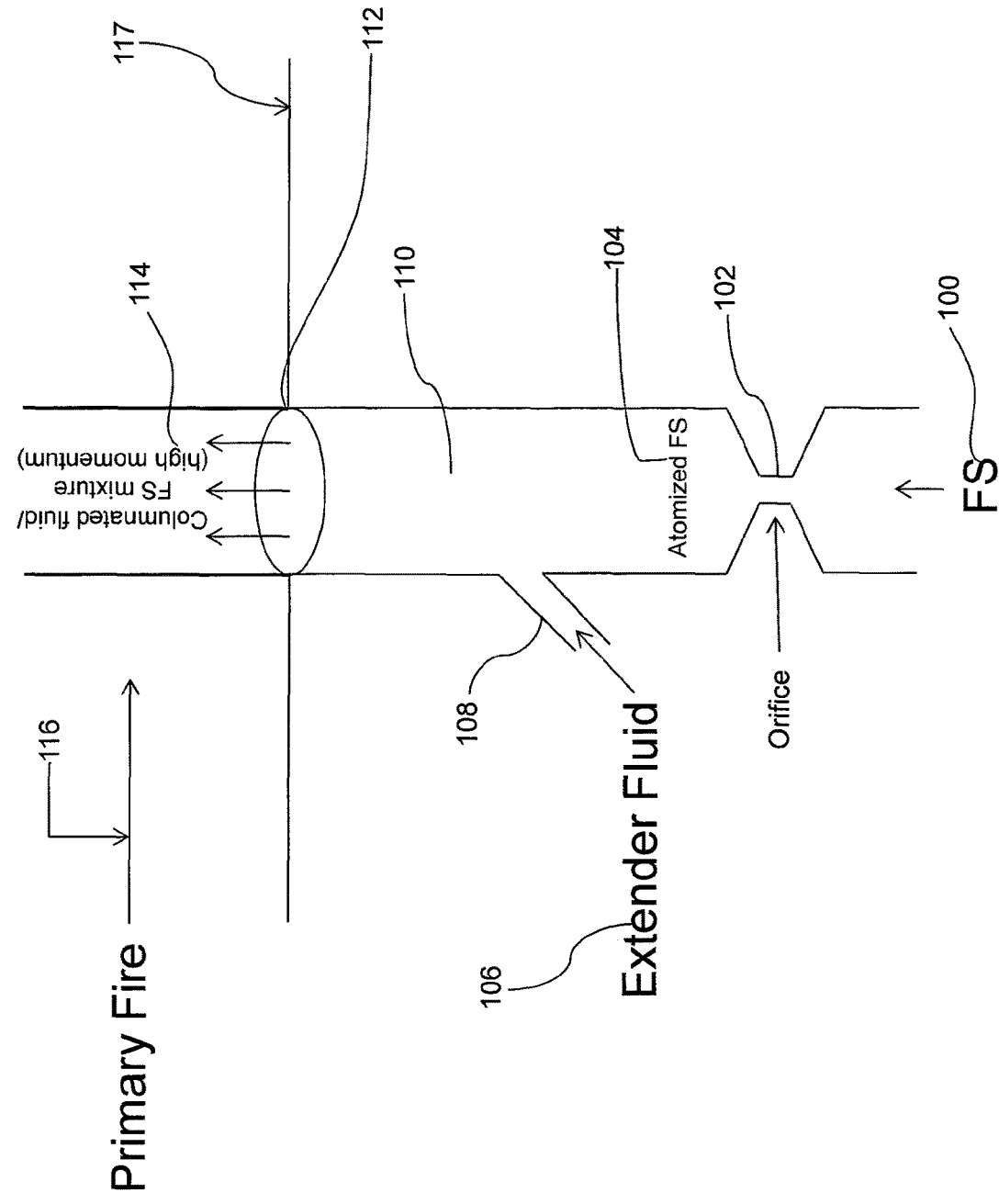

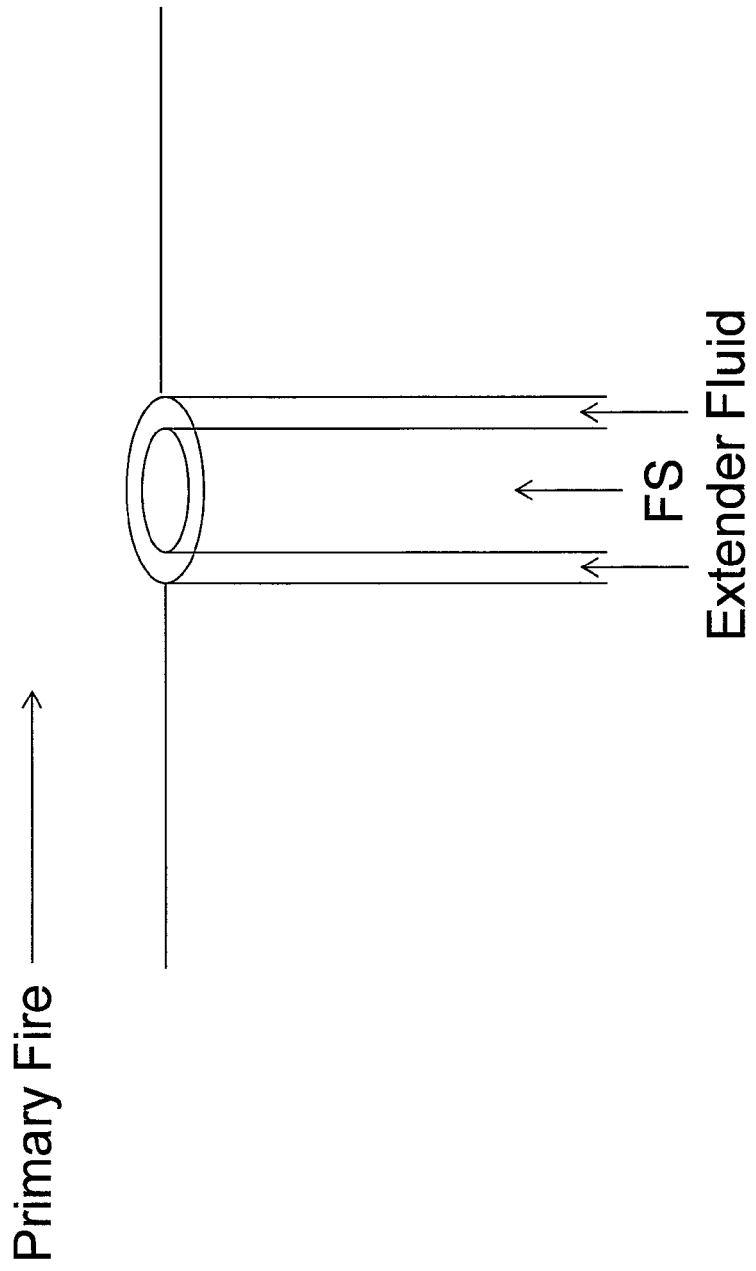

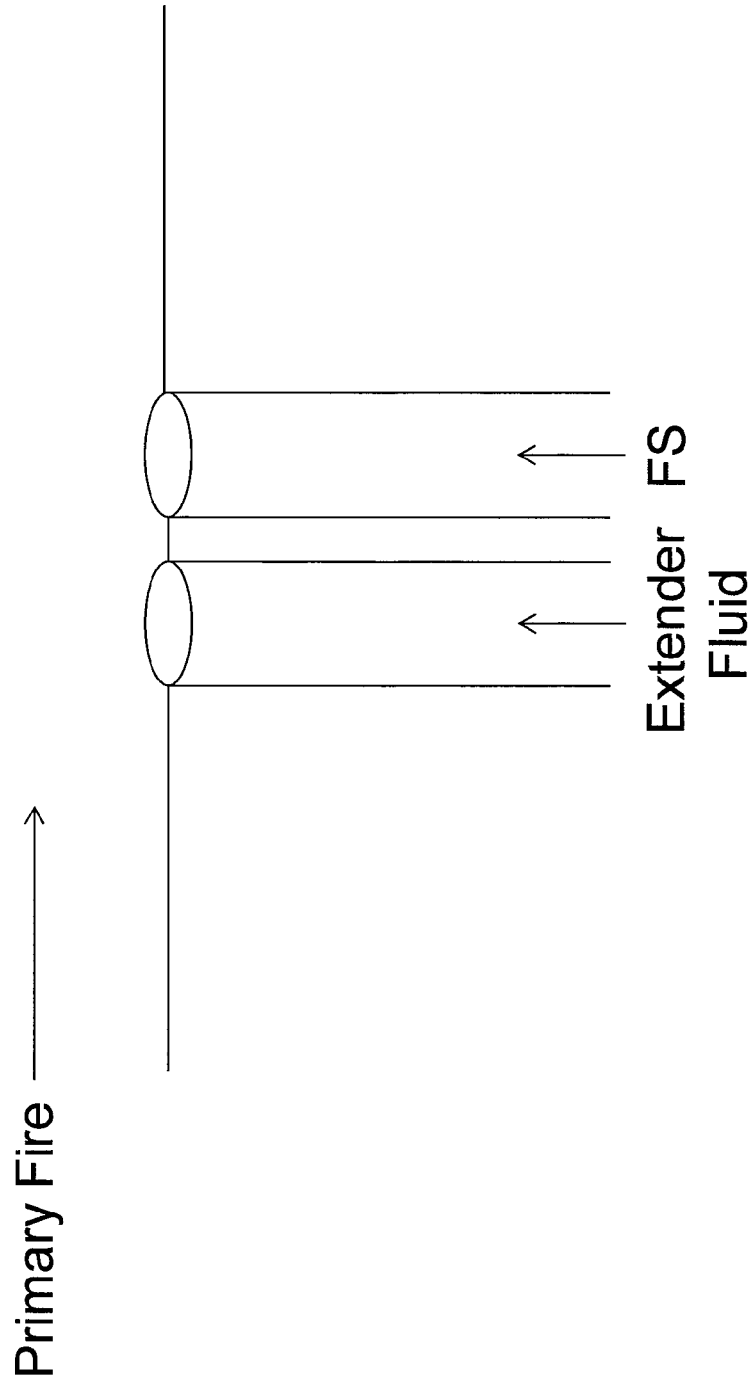

METHOD FOR PRODUCING CARBON BLACK USING AN EXTENDER FLUID

This application is a National Stage Application of PCT/US2014/018545, filed on Feb. 26, 2014, which claims the benefit under 35 U.S.C. § 119(e) of prior U.S. Provisional Patent Application No. 61/789,669 filed Mar. 15, 2013, which is incorporated in its entirety by reference herein.

BACKGROUND OF THE INVENTION

The present invention relates to carbon black and methods for making carbon black. Further, the present invention relates to controlling one or more particle properties of carbon black.

In carbon black manufacturing, changes to carbon black process controls and/or apparatus configurations typically are required when a production line is shifted to manufacture different grades of carbon black, or to accommodate different types of feedstock, and these changes interfere with the continuous and/or efficient operation of the production line. Operational adjustments effective to alter particle properties can be used when a change in a particle property (e.g., structure or surface area) of carbon black, is desired for production reasons. These adjustments cause a process disruption of the carbon black reactor, which may even include a shut down, and the jet nozzles used to introduce the feedstock to form the carbon black are replaced to alter the jet or fluid dynamics which can adjust tint or other properties. Needless to say, shutting down the reactor and altering nozzles can be time consuming and costly.

In addition, in the production of carbon black, certain feedstocks can be more problematic than others, such as the use of coal tar feedstocks and the resulting rate of nozzle tip wear. This can be also true for other feedstocks that are considered feedstocks with higher amounts of small particulates, like ash, which can be problematic for making carbon blacks and/or can be problematic with using small tip sizes for introduction points of the feedstocks due to fear of plugging. In fact, tip plugging can be caused by particulates which can come from the feedstock, coking, potassium, water, to name a few. For purposes of the present invention, the term "jet nozzle" or "nozzle" or "tip" is a reference to the same component.

Also, it would be desirable to improve upon the methods for carbon black production using pre-heated feedstock as described in International Published Application No. WO 2011/103015. In that previous process, pre-heated feedstock was used to gain beneficial properties with regard to the carbon black and on an economic scale. It would be beneficial to improve upon this process to achieve even more efficiency.

Accordingly, it would be beneficial to provide methods for producing carbon black which can achieve one or more of the goals mentioned above.

SUMMARY OF THE PRESENT INVENTION

Accordingly, a feature of the present invention is to provide methods to control at least one particle property of carbon black without any process disruption or shutdown of the carbon black reactor.

Another feature of the present invention is to provide a method to control at least one particle property of carbon black without any need to change the nozzles at the introduction points for the feedstock.

A further feature of the present invention is to provide the ability to increase even further, feedstock pre-heat temperatures in carbon black production with control of thermally induced fouling of the feedstock lines at the increased feedstock temperatures.

An additional feature of the present invention is to provide a method to produce carbon black using feedstocks with high amounts of particulates, like ash.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages and in accordance with the purposes of the present invention, as embodied and broadly described herein, the present invention relates in part, to a method for producing carbon black. The method includes introducing a heated gas stream into a carbon black reactor. The method further includes combining at least one extender fluid with at least one carbon black feedstock to form a fluid-feedstock mixture. The combining preferably is such that the at least one extender fluid increases the momentum of the at least one carbon black feedstock in a direction that is substantially axial (within 10 degrees of axial) or axial to at least one feedstock introduction point to the carbon black reactor. The fluid-feedstock mixture is supplied to at least one feedstock introduction point (preferably several) to the carbon black reactor. The method further includes combining at least the fluid-feedstock mixture through the one or more introduction points to the carbon black reactor with the heated gas stream to form a reaction stream in which carbon black is formed in the carbon black reactor. The method can further include recovering the carbon black in the reaction stream. In this method, the extender fluid can be chemically inert and is preferably chemically inert to the carbon black feedstock.

In lieu of or in addition to combining at least one extender fluid with at least one carbon black feedstock to form a fluid-feedstock mixture, the fluid-feedstock mixture can be created in the reactor. In other words, the at least one extender fluid can be introduced into the reactor and the at least one feedstock can be introduced into the reactor in such a manner that the introduction points for each one is arranged such that the extender fluid increases the momentum of the feedstock into the combustion stream.

The present invention further includes a method for controlling at least one particle property of carbon black, such as structure and/or surface area. The method includes combining at least one extender fluid with at least one carbon black feedstock to form a fluid-feedstock mixture and supplying the fluid-feedstock mixture into a carbon black reactor. The supplying of the fluid-feedstock mixture is in the form of one or more jets. The method further includes controlling the amount of extender fluid present in the fluid-feedstock mixture in order to control at least one particle property, such as tint. Other particle properties can be surface area (e.g., as measured by BET, CTAB, and/or STSA (ASTM D6556)), or structure such as OAN or DBP.

In the methods of the present invention, the carbon black feedstock can be, or include feedstocks with high particulates 0.01 wt % to 0.5 wt %, based on weight of feedstock, such as ash, since the methods of the present invention provide the ability to work with these type of feedstocks without the side effects described earlier.

It is to be understood that both the foregoing general description and the following detail description are exemplary and explanatory only and are intended to provide a further explanation of the present invention as claimed.

The accompanying drawings, which are incorporated in and constitute a part of this application, illustrate aspects of the present invention and together with the description, serve to explain the principles of the present invention. Similar numeral identifiers using the figures refer to similar features.

BRIEF DESCRIPTION OF DRAWINGS

FIG. 6 is a schematic of one example of the injector that depicts the injecting of the extender fluid into atomized feedstock prior to entering the carbon black reactor and the primary fire.

FIGS. 7 and 8 are drawings depicting options for introducing the extender fluid and feedstock without prior mixing before entering the reactor, with an annulus design and a side-by-side design.

DETAILED DESCRIPTION OF THE PRESENT INVENTION

Figure 1:
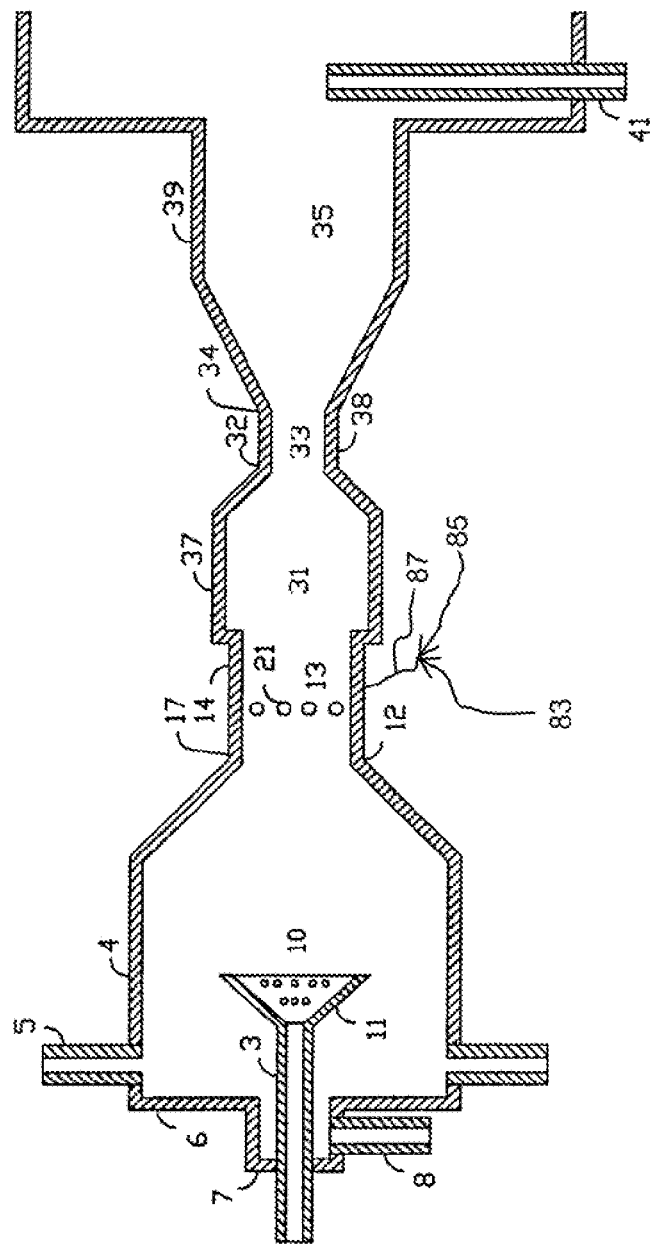
FIGS. 1-5 are schematics of a portion of various types of furnace carbon black reactors which may be utilized in a process of the present invention to produce carbon blacks. This carbon black reactor is only illustrative of the reactors which may be used in the present invention.

The present invention relates to methods for producing carbon black. The present invention also relates to methods to control at least one particle property of carbon black. Also, the present invention relates to the ability to use feedstocks with high amounts of particulates without plugging any of the introduction points to the reactor. Also, the present invention relates to methods to increase even further feedstock pre-heat temperatures in carbon black production with control of thermally induced fouling of the feedstock lines at the increased feedstock temperatures.

In the manufacture of carbon black, a fuel is combusted to generate a stream of hot gas which flows at high velocity through a transition zone where carbon black feedstock is introduced and mixed with the stream of hot gas. The mixture continues at high velocity into a hot reactor where the feedstock undergoes pyrolysis to yield particles of carbon black, the reaction is then quenched, reactants are cooled, and carbon black product is collected on a filter.

In general, one aspect of the present invention relates to producing carbon black by combining at least one extender fluid with at least one carbon black feedstock prior to introducing the feedstock (or after introducing the feedstock) into the reactor through one or more introduction points. With the use of an extender fluid, to be described in further detail below, the extender fluid(s) has the ability to provide various advantages, including one or more of the following: the ability to work with various kinds of carbon black feedstocks including what is considered feedstocks with high amounts of particulates (e.g., ash), such as coal tar feedstocks for carbon black manufacturing; the ability to pre-heat a carbon black-yielding feedstock even higher than previously described; the ability to control one or more particle properties of carbon black; the ability to use lower pressures for feedstock introduction; and/or other benefits.

The extender fluid can be a gas or liquid. Preferred examples are gases. The extender fluid can be chemically inert to the carbon black feedstock and is preferably chemically inert to the carbon black feedstock. The extender fluid can be at least one inert gas (e.g., argon, neon, helium, and the like). The extender fluid can be nitrogen alone or with other gases. The extender fluid can be steam, water, air, carbon dioxide, carbon monoxide, hydrogen, carbon black tailgas, natural gas, or nitrogen, one or more inert gases, or any combinations thereof. In general, the gas or liquid has a purity of at least 95% by weight (e.g., at least 97%, at least 98%, at least 99%, at least 99.5%, or at least 99.9% by weight) of the gas or liquid. For instance, when nitrogen is used (alone or with other gases/liquids), nitrogen gas has a purity of at least 95% by weight of that gas.

The extender fluid, when combined with at least one carbon black feedstock to form a fluid-feedstock mixture, can be optionally uniformly distributed in the carbon black feedstock. The combining of the extender fluid(s) with at least carbon black feedstock leads to a fluid-feedstock mixture wherein the extender fluid is distributed (uniformly or non-uniformly) in the carbon black feedstock.

Prior to the extender fluid being combined with the carbon black feedstock, the carbon black feedstock can be atomized or at least partially atomized. The extender fluid is optionally not used as the means for atomizing the carbon black feedstock in the present invention. The extender fluid preferably provides momentum to the carbon black feedstock upon being combined with the carbon black feedstock. The term "momentum" is a reference to momentum as understood in fluid mechanics. As an option, the extender fluid upon being combined with the carbon black feedstock provides the momentum to form a columnar jet of fluid-feedstock mixture as the mixture exits the nozzle and enters the carbon black reactor. The extender fluid has the ability to channel the momentum of the feedstock. The fluid-feedstock mixture is channeled in the injector such that the forward momentum of the fluid-feedstock mixture upon entry into the reactor continues in a direction axial to the central axis of the injector (or substantially axial to the central axis of the injector, e.g., within 10 degrees of being axial to the central axis). The fluid-feedstock mixture further is projected such that it is preferably perpendicular (or substantially perpendicular, that is within 10 degrees) to the primary fire or combustion stream, and/or is preferably perpendicular (or substantially perpendicular, that is within 10 degrees) to the wall of the carbon black reactor. As an option, the fluid-feedstock mixture or the injector used to inject the fluid-feedstock mixture can be at any angle with respect to the primary fire or combustion stream (e.g., perpendicular (90 deg), substantially perpendicular (80-110 deg), or other angles (such as 20-79 degs, 20 deg, 30 deg, 40 deg, 45 deg, 50 deg, 55 deg, 60 deg, 65 deg, 75 deg and the like)). An example of the combining of the extender fluid and carbon black feedstock is shown in FIG. 6. In FIG. 6, carbon black feedstock 100 enters an orifice 102 and exits the orifice as atomized carbon black feedstock 104. Extender fluid 106 is introduced through port 108 and combines with the atomized carbon black feedstock 104 to form a fluid-feedstock mixture 110. The mixture 110 has increased momentum compared to the momentum that existed prior to the introducing of the extender fluid. This mixture 110 exits the injector through a nozzle or port 112 in the reactor wall 117 as a columnar jet of fluid-feedstock mixture with high momentum (114) which then penetrates into the high velocity combustion stream or primary fire 116. Thus, preferably, in the present invention, the combining of the at least one extender fluid with at least one carbon black feedstock to form a fluid-feedstock mixture is such that the at least one extender fluid increases the momentum of the at least one carbon black feedstock in a direction that is axial or substantially axial to at least one feedstock introduction point to the carbon black reactor.

The amount of extender fluid(s) that is combined with the carbon black feedstock is adjustable. The amount of extender fluid that is combined with the carbon black feedstock can be adjustable while the method is on-line and producing carbon black. In other words, the amount of extender fluid can be changed "on the fly." Thus, because the amount of extender fluid can be combined with the carbon black feedstock in an adjustable manner, this can be done without shutting down the reactor. Thus, continuous carbon black production can be maintained, even when reactor conditions are adjusted to yield different grades of carbon black, or to optimize a grade of carbon black being manufactured, or adjusting/changing the quality of carbon black being manufactured and/or other adjustments that are made to the process/reactor during carbon black manufacturing.

Generally, the extender fluid can be introduced into the carbon black feedstock at any pressure but generally high pressures are preferred to achieve desired mixing of the extender fluid with the carbon black feedstock especially when the extender fluid is a gas. Suitable pressures can be from about 1 lb/in$^2$ to about 350 lb/in$^2$, or from about 50 lb/in$^2$ to about 175 lb/in$^2$, or from about 20 lb/in$^2$ to about 200 lb/in$^2$ or higher, or from about 100 lb/in$^2$ to about 200 lb/in$^2$ or higher.

These pressures and other pressures can be used to introduce the extender fluid into the carbon black feedstock. The pressure can be sufficient to penetrate into the carbon black feedstock to form the fluid-feedstock mixture and preferably where the extender fluid is uniformly distributed throughout the carbon black feedstock.

Any amounts of extender fluid can be present in the fluid-feedstock mixture. For instance, the extender fluid can be present in the fluid-feedstock mixture in an amount of from about 0.1 weight percent to about 400 weight percent (or higher), based on the weight of the carbon black feedstock. Other amounts include, for instance from about 0.1 weight percent to about 100 weight percent or more, based on the weight of the carbon black feedstock or from about 5 weight percent to about 15 weight percent, based on the weight of the carbon black feedstock, or from about 0.1 weight percent to about 50 weight percent, based on the weight of the carbon black feedstock, or from about 1 weight percent to about 40 weight percent, based on the weight of the carbon black feedstock.

The supplying of the fluid-feedstock mixture can be in the form of one or more jets. The type of extender fluid and/or the amount of extender fluid is capable of adjusting jet penetration of the fluid-feedstock mixture into the heated gas stream. As stated earlier, with the use of a fluid-feedstock mixture, which is delivered in the form of one or more jets, the amount of extender fluid and/or the type of extender fluid is capable of adjusting jet penetration of the fluid-feedstock mixture into the heated gas stream without any nozzle change and/or without the need to have a process disruption or shut down the carbon black reactor.

As an option, the extender fluid can be combined with the carbon black feedstock at a point that is prior to the introduction point of the fluid-feedstock mixture into the carbon black reactor. The fluid can be introduced in such a way that the fluid and feedstock are mixed together prior to exiting the injector/nozzle. The extender fluid can be combined with the carbon black feedstock at a point that is more than or less than 0.5 inch, such as at least 0.75 inch, at least 1 inch, at least 2 inches, at least 4 inches, or at least 6 inches prior to the introduction point at the reactor.

As an option, the extender fluid can be combined with the carbon black feedstock after their respective introductions into the carbon black reactor. In other words, the extender fluid can be introduced into the carbon black reactor separately from the carbon black feedstock. Any geometry to achieve the separate introduction of extender fluid and carbon black feedstock into the reactor such that the two fluids are adjacent to each other or contact each other in the reactor can be used. For instance, as shown in FIGS. 7 and 8, the introduction of the extender fluid and carbon black feedstock separately can be done with piping that has an annulus hollow design such that one of the fluids surrounds the other fluid. Another geometry that can be used is to have the introduction points for the extender fluid and carbon black feedstock side by side. In this design, one of the introduction points can be in front of the other in a slight manner for instance such as by one-half inch or one inch or more. When the extender fluid and carbon black feedstock are separately introduced into the reactor, the geometry is such that the extender fluid contacts the carbon black feedstock fluid, and the extender fluid increases the momentum of the feedstock fluid into the combustion stream (or cross-flow stream). There is no limitation with regard to the geometry that can be used to achieve this dual separate introduction of the extender fluid and carbon black feedstock. Again one or more introduction points can be used, such as around the circumference of the reactor, such as at the throat section.

For every introduction point of carbon black feedstock, there can be either a pre-combining of extender fluid with the carbon black feedstock prior to the introduction of the feedstock into the carbon black reactor and/or a respective introduction point for the extender fluid for every carbon black feedstock introduction point that exist.

The manner in which the fluid-feedstock mixture is introduced into the carbon black reactor, such as at the transition point of the process, can be done in the form of one or more jets or jet nozzles, or in combination with or in the alternative, with one or more lances. When jet nozzles are used, these are typically located at a radial position around the circumference of the reactor, for instance as shown in FIG. 1. When a lance is used, this typically is more in the axial center of the reactor location.

In the present invention, for any method, the carbon black-yielding feedstock can be or include any liquid hydrocarbon with a specific gravity of from about 0.9 to about 1.5 or higher (such as from 0.9 to 1.3, or from 1 to 1.2 and the like) or any combination thereof. The carbon black-yielding feedstock can have an initial boiling point of from about 160° C. to about 600° C., such as from 160° C. to about 500° C. or 200° C. to about 450° C. or 215° C. to about 400° C. and the like. The carbon black yielding feedstock can be any conventional carbon black yielding feedstock which results in the formation of carbon black. For instance, any hydrocarbon material can be used. A suitable feedstock can be any carbon black-yielding hydrocarbon feedstock which is readily volatilizable under the conditions of the reaction. For example, unsaturated hydrocarbons such as acetylene; olefins such as ethylene, propylene, butylene; aromatics such as benzene, toluene and xylene; certain saturated hydrocarbons; and other hydrocarbons such as kerosenes, naphthalenes, terpenes, ethylene tars, aromatic cycle stocks and the like may be used.

The carbon black-yielding feedstock that can be processed using the present invention generally can include any hydrocarbon liquid or oil feedstocks useful for carbon black production. Suitable liquid feedstocks include, for example, unsaturated hydrocarbons, saturated hydrocarbons, olefins, aromatics, and other hydrocarbons such as kerosenes, naphthalenes, terpenes, ethylene tars, coal tars, cracker residues, and aromatic cycle stocks, or any combinations thereof. The feedstocks can be, for example, decant oil, coal tar product, ethylene cracker residues, asphaltene containing oil, or any combinations thereof. Feedstock type can affect fouling behavior. Chemistries can vary between the different feedstock types and/or within a feedstock type. Based on experience and lab testing, decant oil, coker oil, coal tars, and ethylene cracker residues, for example, all can foul at various temperatures above about 300° C. Ethylene cracker residues (ECR), for example, can be relatively high in asphaltenes. Other feedstock types also can contain asphaltenes and/or have chemistries subject to other fouling mechanisms.

The asphaltene content of the feedstock can be, for example, from 0% to about 30% by weight, or at least about 0.5% by weight, or at least about 1% by weight, or at least about 2% by weight, or at least about 3% by weight, or from about 1% to about 10% by weight, or from about 2% to about 7.5% by weight, or from about 2.5% to about 5% by weight, based on total feedstock weight. The feedstock can have an initial boiling point, for example, of from about 160° C. to about 500° C., or from about 180° C. to about 450° C., or from about 200° C. to about 400° C., or from 225° C. to about 350° C. The initial boiling point refers to temperature at which the first feedstock component (of the feedstock) evaporates. The feedstock can have a midrange boiling point, for example, of from about 380° C. to about 800° C., or from about 400° C. to about 500° C., or from about 425° C. to about 475° C., or from 440° C. to about 460° C. The midrange boiling point refers to temperature at which 50% of feedstock components have evaporated. The feedstock can have a final boiling point, for example, of from about 600° C. to about 900° C., or from about 625° C. to about 725° C., or from about 650° C. to about 700° C., or from 670° C. to about 690° C. The final boiling point refers to temperature at which 100% of feedstock components have evaporated. Other initial, midrange, and/or final boiling points may apply, depending on the choice and chemistry of the feedstock.

The methods of the present invention can be used with furnace carbon black reactors with adaptations and modifications such as related herein. The methods of the present invention can be practiced, for example, in a modular, also referred to as "staged," furnace carbon black reactor. Staged furnace reactors that can be adapted or modified to practice the present invention are shown, for example, in U.S. Pat. Nos. 3,922,335; 4,383,973; 5,190,739; 5,877,250; 5,904,762; 6,153,684; 6,156,837; 6,403,695; and 6,485,693 B1, all of which are incorporated in their entireties by reference herein.

With respect to the stream of hot gases (or heated gas stream) that is combined with the carbon black yielding feedstock, the stream of hot gases can also be considered hot combustion gases or a heated gas stream, that can be generated by contacting a solid, liquid, and/or gaseous fuel with a suitable oxidant stream such as, but not limited to, air, oxygen, mixtures of air and oxygen, or the like. Alternatively, a preheated oxidant stream may be passed through without adding a liquid or gaseous fuel. Examples of the fuel suitable for use in contacting the oxidant stream to generate the hot gases include any of the readily combustible gas, vapor, or liquid streams, such as natural gas, hydrogen, carbon monoxide, methane, acetylene, alcohol, recycled tail gas, or kerosene. Generally, it is preferred to use fuels having a high content of carbon-containing components and in particular, hydrocarbons. The ratio of air to fuel utilized to produce the carbon blacks of the present invention may be from about 0.7:1 to infinity, or from about 1:1 (stiochiometric ratio) to infinity. To facilitate the generation of hot gases, the oxidant stream may be preheated. Essentially, the heated gas stream is created by igniting or combusting the fuel and/or oxidant. Temperatures such as from about 1000 deg C. to about 3500 deg C. for the heated gas stream can be obtained.

With the present invention, the jet penetration of the feedstock can be adjusted by the extender fluid. For instance, the extender fluid has the ability to affect choke flow velocity or critical velocity or both of the one or more jets of the fluid-feedstock mixture that is in the form of a jet stream as it is introduced through one or more introduction points into the reactor. The higher the amount of extender fluid, the higher the choke flow velocity of the mixture or critical velocity of the mixture (where choke flow velocity and critical velocity refer to the speed of sound for that mixture), and therefore the more penetration of the jet into the heated gas stream.

Another advantage of the present invention is the ability to increase the overall yield of carbon black using an extender fluid. With the present invention, more carbon black can be made using the same amount of feedstock fluid. For instance, the yield can be increased by at least 1%, at least 2%, or at least 5%, wherein the yield % is based on the percent of carbon black by weight. Yields can be further increased using the option of pre-heating (as described herein) the extender fluid, the carbon black feedstock, or both.

Another advantage of the present invention is with regard to the ability to use large orifice or nozzle sizes. In some carbon black processes, large orifice or nozzle sizes are used due to particulates in the carbon black feedstock. Large nozzle sizes are used to avoid clogging up the nozzle due to the particulates present. However, if large nozzle sizes are used, this may prevent sufficient or good penetration of the feedstock fluid into the combustion stream of heated gas due to reduced feedstock pressure and velocity. However, with the present invention, the use of extender fluid provides the ability to increase the momentum of the feedstock fluid, even coming from large nozzle sizes, such that penetration is achieved on the same level as with small nozzle sizes to achieve desired carbon black formation.

As an option, the carbon black feedstock that is mixed with the extender fluid can be heated prior to being combined with the extender fluid. In other words, the carbon black feedstock can be pre-heated. The pre-heating of the feedstock and the techniques involved can be as set forth in International Publication No. WO 2011/103015, incorporated in its entirety by reference herein.

In the present invention, as an option, the carbon black feedstock prior to being combined with the extender fluid can be heated to a temperature of greater than 300° C. or from about 360° C. to about 850° C. or higher, or from about 400° C. to about 600° C. or other temperatures.

In the present invention, as an option, the extender fluid prior to being combined with the carbon black feedstock can be heated to a temperature of at least 100° C., at least 300° C., or at least 500° C., or at least 750° C., or at least 1000° C., or at least 1200° C., or other temperatures.

In the present invention, as an option, the extender fluid and the carbon black feedstock, prior to being combined together, can each be pre-heated separately to the same or different pre-heat temperatures. The pre-heat temperatures can be the ranges provided above namely, can be heated to a temperature of greater than 300° C. or from about 360° C. to about 850° C. or higher, or from about 400° C. to about 600° C. for the carbon black feedstock, and/or a temperature of at least 100° C., at least 300° C., or at least 500° C., or at least 750° C., or at least 1000° C., or at least 1200° C., or other temperatures for the extender fluid. As a further option, the fluid-feedstock mixture can be optionally heated, to a higher temperature, with or without the pre-heating of the carbon black feedstock and/or extender fluid.

As an option, the carbon black feedstock can be heated to a first temperature such as a temperature of at least 300° C. for instance 300° C. to about 850° C., prior to combining with the extender fluid to form a fluid-feedstock mixture and then the fluid-feedstock mixture can be further heated to a second temperature that is higher than the temperature of the pre-heated carbon black feedstock alone prior to it being combined with the extender fluid. This heating of the fluid-feedstock mixture to a higher temperature can be at least 50° C. higher than the pre-heated feedstock such as at least 75° C. higher or at least 100° C. higher and the like. As an option, the carbon black feedstock can be heated or pre-heated to a first temperature prior to being combined with the extender fluid to form the fluid-feedstock mixture and can be further heated to a second temperature that is higher than the first temperature, such as up to about 950° C.

The method can include quenching the carbon black in the reaction stream. The carbon black in the reaction stream can be quenched in one or more zones. For example, in FIG. 2, at quench location 18 of quench zone 14, quenching fluid is injected, which can include water, and which can be used to completely or essentially completely stop pyrolysis of the carbon black-yielding feedstock, or only partially cool the feedstock without stopping pyrolysis followed by a secondary quench (not shown) used to stop pyrolysis of the carbon black-yielding feedstock. Other post quenching steps that are conventional in carbon black manufacturing can be used in the methods of the present invention. After the mixture of hot combustion gases and carbon black-yielding feedstock is quenched, the cooled gases pass downstream into any conventional cooling and separating means whereby the carbon black is recovered. The separation of the carbon black from the gas stream is readily accomplished by conventional means such as a precipitator, cyclone separator or bag filter. With respect to completely quenching the reactions to form the final carbon black product, any conventional means to quench the reaction downstream of the introduction of the second carbon black yielding feedstock can be used and is known to those skilled in the art. For instance, a quenching fluid can be injected which may be water or other suitable fluids to stop the chemical reaction.

As described above and in further detail, one method can include introducing a heated gas stream into a carbon black reactor. The method further optionally includes supplying at least one carbon black-yielding feedstock having a first temperature below the preheat temperature to be achieved, such as below 300° C. or below 275° C. (e.g., from 40° C. to 2'74° C., from 50° C. to 270° C., from 70° C. to 250° C., from 60° C. to 200° C., from 70° C. to 150° C., and the like) to at least one heater (e.g., at least two heaters, at least three heaters, and the like where the heaters can be the same or different from each other). The at least one extender fluid can be combined with the carbon black-yielding feedstock at any point prior to and/or after introduction of the carbon black-yielding feedstock into the reactor. Ideally, a higher benefit is obtained when the extender fluid is mixed or combined before introduction into the reactor. This can be done just prior to the introduction point or at any point after the heater stage described herein for pre-heating or before the heater stage. The temperature of the feedstock entering the at least one heater is below the targeted preheat temperature or temperature range. The feedstock prior to being preheated can travel, as an option, at a first velocity of least about 0.2 m/sec (e.g., at least about 0.4 m/sec, at least about 0.6 m/sec, at least about 0.8 m/sec, at least about 1 m/sec, at least about 1.1 m/sec, at least about 1.6 m/sec, such as from 0.2 m/sec to 4 m/sec, from 1.1 to 3 m/sec and the like). Other velocities can be used provided other processing conditions are selected to control fouling and/or coking in the heater(s) and supply lines to the reactor.

The method can include preheating the at least one carbon black-yielding feedstock in the at least one heater to a second temperature of greater than about 300° C. (e.g., at least 350° C., at least 360° C., at least 400° C., at least 450° C., at least 500° C., such as from 300° C. to 850° C., or from 360° C. to 800° C., from 400° C. to 750° C., from 450° C. to 700° C. and the like) to provide a preheated carbon black-yielding feedstock, wherein (a) the at least one carbon black-yielding feedstock has a velocity in the at least one heater that is at least 0.2 m/sec, wherein velocity is calculated based on a feedstock density measured at 60° C. at 1 atm and based on the smallest cross-sectional area of a feedstock line present in the at least one heater. Since it can be very difficult to measure velocity of a feedstock at such an elevated temperature, for purposes of the present invention, the velocity as recited herein is based on these specific measuring conditions. Whatever the smallest diameter or smallest cross-sectional area is present in the actual heater, this minimum cross-sectional area is used to determine velocity as recited herein for purposes of the present invention. Many heaters have the same diameter throughout the heater, but in the event that several diameters or cross-sectional areas are present in the heater(s), this condition is provided. Velocity is based upon minimum cross-sectional area. The actual velocity through the feedstock heater can generally be faster than the velocity measured at 60° C. at 1 atm.

In the method, the carbon black-yielding feedstock can have a first feedstock residence time in the heater of less than about 120 minutes (e.g., less than 100 minutes, less than 80 minutes, less than 60 minutes, less than 40 minutes, less than 30 minutes, less than 20 minutes, less than 10 minutes, such as from 1 second to 119 minutes, from 5 seconds to 115 minutes, from 10 seconds to 110 minutes, from 30 seconds to 100 minutes, from 1 minute to 60 minutes, from 5 minutes to 30 minutes, and the like).

The method can include supplying the preheated carbon black-yielding feedstock (optionally pre-combined with extender fluid) to at least one feedstock introduction point to the carbon black reactor (e.g, at least one or two or three or four feedstock introduction points), wherein the preheated carbon black-yielding feedstock has a second feedstock residence time measured from exiting the heater(s) to right before the introduction point to the carbon black reactor of less than about 120 minutes (e.g., less than 100 minutes, less than 80 minutes, less than 60 minutes, less than 40 minutes, less than 30 minutes, less than 20 minutes, less than 10 minutes, such as from 1 second to 119 minutes, from 5 seconds to 115 minutes, from 10 seconds to 110 minutes, from 30 seconds to 100 minutes, from 1 minute to 60 minutes, from 5 minutes to 30 minutes, and the like). The first feedstock residence time and the second feedstock residence time combined are preferably 120 minutes or less (e.g., less than 100 minutes, less than 80 minutes, less than 60 minutes, less than 40 minutes, less than 30 minutes, less than 20 minutes, less than 10 minutes, such as from 1 second to 119 minutes, from 5 seconds to 115 minutes, from 10 seconds to 110 minutes, from 30 seconds to 100 minutes, from 1 minute to 60 minutes, from 5 minutes to 30 minutes, and the like). For instance, referring to the Figures, the second feedstock residence time would be, for example, the time that the feedstock exits the heater 19 in FIG. 2 or heater 22 in FIG. 3 to the introduction point to the reactor, shown as introduction point 16 in FIG. 2 and FIG. 3. The combination of the first feedstock residence time and the second feedstock residence time would be the total feedstock residence time.

As an option, if the feedstock line to the heater is about the same cross-section as the supply line through the heater, the carbon black-yielding feedstock can have a velocity in the heater(s) that is about the same or greater (e.g., at least 1% greater, at least 2% greater, at least 3% greater, at least 5% greater, at least 7% greater, at least 10% greater, at least 100% greater, at least 200% greater, such as from 1% to 200% greater or from 20% to 100% greater and the like) than the first velocity at the entry to the heater(s).

The method of the present invention can include pressurizing the carbon black-yielding feedstock(s). The method can include pressurizing or using a pressure for the carbon black yielding feedstock(s) such that the preheating of the carbon black yielding feedstock avoids formation of vapor film in the at least one heater or prior to supplying to the carbon black reactor. The method of the present invention can include pressurizing the carbon black-yielding feedstock(s) to have a pressure, for instance, of greater than about 10 bar prior to entering the at least one heater that preheats the carbon black-yielding feedstock. This pressure can be at least 15 bar, at least 20 bar, at least 30 bar, at least 40 bar, such as from 10 bar to 180 bar or more, from 15 bar to 150 bar, from 20 bar to 125 bar, from 25 bar to 100 bar.

In the present invention, a method for producing carbon black can include introducing a heated gas stream into a carbon black reactor. The method further includes supplying carbon black-yielding feedstock having a first temperature of below the targeted preheat feedstock temperature, such as below 300° C. or below 275° C. (e.g., from 40° C. to 274° C., from 50° C. to 270° C., from 70° C. to 250° C., from 60° C. to 200° C., from 70° C. to 150° C., and the like) to heater(s) at a first pressure of greater than 10 bar. This pressure can be at least 15 bar, at least 20 bar, at least 30 bar, at least 40 bar, such as from 10 bar to 180 bar or more, from 15 bar to 150 bar, from 20 bar to 125 bar, from 25 bar to 100 bar.

The method can include preheating the at least one carbon black-yielding feedstock in the heater(s) (e.g., at least two heaters, at least three heaters, and the like, where the heaters can be the same or different from each other) to a second temperature of greater than about 300° C. (e.g., at least 350° C., at least 360° C., at least 400° C., at least 450° C., at least 500° C., such as from 300° C. to 850° C., or from 360° C. to 800° C., from 400° C. to 750° C., from 450° C. to 700° C. and the like) to provide a preheated carbon black-yielding feedstock, wherein (a) the carbon black-yielding feedstock has a second pressure in the at least one heater that is about the same or lower (e.g., at least 1% lower, at least 2% lower, at least 3% lower, at least 5% lower, at least 7% lower, at least 10% lower, at least 15% lower, at least 20% lower, such as from 1% to 75% lower or from 3% to 20% lower and the like) than the first pressure and (b) the carbon black-yielding feedstock has a first feedstock residence time in the heater of less than about 120 minutes (e.g., less than 100 minutes, less than 80 minutes, less than 60 minutes, less than 40 minutes, less than 30 minutes, less than 20 minutes, less than 10 minutes, such as from 1 second to 119 minutes, from 5 seconds to 115 minutes, from 10 seconds to 110 minutes, from 30 seconds to 100 minutes, from 1 minute to 60 minutes, from 5 minutes to 30 minutes, and the like).

As stated earlier, in any of the methods described here or earlier or later, the at least one extender fluid can be combined or mixed with the preheated carbon black-yielding feedstock at any point (prior to pre-heating, during pre-heating, and/or after pre-heating, and/or before and/or after introduction into the carbon black reactor).

The method can include supplying the preheated carbon black-yielding feedstock to at least one feedstock introduction point to the carbon black reactor, wherein the preheated carbon black-yielding feedstock has a second feedstock residence time of from exiting the at least one heater to the introduction point to the carbon black reactor of less than about 120 minutes (e.g., less than 100 minutes, less than 80 minutes, less than 60 minutes, less than 40 minutes, less than 30 minutes, less than 20 minutes, less than 10 minutes, such as from 1 second to 119 minutes, from 5 seconds to 115 minutes, from 10 seconds to 110 minutes, from 30 seconds to 100 minutes, from 1 minute to 60 minutes, from 5 minutes to 30 minutes, and the like); and wherein the first feedstock residence time and the second feedstock residence time combined are 120 minutes or less (e.g., less than 100 minutes, less than 80 minutes, less than 60 minutes, less than 40 minutes, less than 30 minutes, less than 20 minutes, less than 10 minutes, such as from 1 second to 119 minutes, from 5 seconds to 115 minutes, from 10 seconds to 110 minutes, from 30 seconds to 100 minutes, from 1 minute to 60 minutes, from 5 minutes to 30 minutes, and the like).

The present invention can relate to a method for producing carbon black that includes introducing a heated gas stream into a carbon black reactor. The method further includes supplying at least one carbon black-yielding feedstock having a first temperature that is below the targeted preheat feedstock temperature, such as below 300° C. or below 275° C. (e.g., from 40° C. to 274° C., from 50° C. to 270° C., from 70° C. to 250° C., from 60° C. to 200° C., from 70° C. to 150° C., and the like) to at least one heater (e.g., at least two heaters, at least three heaters, and the like where the heaters can be the same or different from each other) at a first pressure of greater than 10 bar. As an option, the velocity entering the heater can be a first velocity of at least about 0.2 m/sec (e.g., at least about 0.4 m/sec, at least about 0.6 m/sec, at least about 0.8 m/sec, at least about 1 m/sec, at least about 1.1 m/sec, at least about 1.6 m/sec, such as from 0.2 m/sec to 2 m/sec, from 0.4 to 1.8 m/sec and the like).

The method includes preheating the carbon black-yielding feedstock in the heater(s) to a second temperature of greater than about 300° C. (e.g., at least 350° C., at least 360° C., at least 400° C., at least 450° C., at least 500° C., such as from 300° C. to 850° C., or from 360° C. to 800° C., from 400° C. to 750° C., from 450° C. to 700° C. and the like) to provide a preheated carbon black-yielding feedstock, wherein (a) the carbon black-yielding feedstock has a velocity in the heater(s) that is at least 0.2 m/sec, wherein velocity is calculated based on a feedstock density measured at 60° C. at 1 atm and the smallest cross-sectional area of a feedstock line present in the at least one heater, and (b) wherein the at least one carbon black-yielding feedstock has a second pressure in the heater(s) that is about the same or lower (e.g., at least 1% lower, at least 2% lower, at least 3% lower, at least 5% lower, at least 7% lower, at least 10% lower, at least 15% lower, at least 20% lower, such as from 1% to 25% lower or from 3% to 20% lower and the like) than the first pressure, wherein the pressure can be calculated based on assuming same cross-sectional area that feedstock travels in during first pressure and second pressure (though in actual operation, the cross-sectional area can be the same or different). This manner of determination can be used in order to properly compare pressure, though is not mandatory.

The method can include supplying the preheated carbon black-yielding feedstock (optionally pre-combined with extender fluid) to at least one feedstock introduction point to the carbon black reactor and combining at least the preheated carbon black-yielding feedstock through the introduction point(s) to the carbon black reactor with the heated gas stream to form a reaction stream in which carbon black is formed in the carbon black reactor. The method can include quenching the carbon black in the reaction stream.

In the present invention, for any method, the stated target preheat temperatures are preferably an average temperature of the feedstock prior to introduction into the carbon black reactor. The stated preheat temperatures of the feedstock can be a maximum temperature of the feedstock or a minimum temperature of the feedstock prior to introduction into the carbon black reactor.

In the present invention, for any method, the stated target pressure is preferably an average pressure of the feedstock. The stated pressure of the feedstock can be a maximum pressure of the feedstock or a minimum pressure of the feedstock.

In the present invention, for any method, the stated target velocity is preferably an average velocity of the feedstock. The stated velocity of the feedstock can be a maximum velocity of the feedstock or a minimum velocity of the feedstock.

The preheating can occur in any number of ways and no limitations are meant to be placed on the manner to achieve this. The preheating can occur in at least one heater (e.g, one, two, three or more). The source of the heat for the at least one heater can be any source, such as from one or more carbon black reactors, electrical heat, plasma heat, heat from tailgases, heat from combustion of tailgas, fuels, and/or heat from other industrial processes and/or other forms of heat, and/or any combination thereof. The preheating can occur where the at least one heater partially or completely heats the feedstock to the target preheat temperature for introduction into the reactor. One heater can achieve the partial or complete preheating or two or more heaters can be used in sequence or other arrangements to achieve the preheating (full or partial). If partial preheating is achieved by the at least one heater, then the remaining preheat is accomplished by an additional or a secondary heat source or further heaters to ultimately obtain the target preheat temperature.

For instance, the preheating of the at least one carbon black-yielding feedstock can include or be accomplished by heating the carbon black-yielding feedstock in at least one heater that has a heat exchanger. The heat exchanger can be operating at an average heat flux of greater than about 10 kW/m$^2$ (such as greater than about 10 kW/m$^2$ or greater than about 20 kW/m$^2$ or greater than about 30 kW/m$^2$ or greater than about 40 kW/m$^2$, such as from about 10 kW/m$^2$ to about 150 kW/m$^2$ and the like).

As an option, at least a portion of the preheating (or complete preheating) occurs in at least one heater that has heat at least partially (or completely) provided by heat generated by the carbon black reactor that is receiving the preheated feedstock or another carbon black reactor(s) or both. The at least one heater can be in heat exchange with at least a portion of the carbon black reactor that is receiving the preheated feedstock or a different carbon black reactor(s) or both. For instance, at least one heater can contact the reaction stream in a carbon black reactor, for instance, downstream of a quencher, wherein the at least one heater can have a heat exchanger having walls heated by the reaction stream on a first side (e.g., outer wall) thereof and contacting the carbon black-yielding feedstock on an opposite side (e.g., inner wall) thereof. As an option, the at least one heater can include a heat exchanger that exchanges heat with the reaction stream in a carbon black reactor, wherein a flowable heat carrier that flows through the heat exchanger is heated, and the heat carrier passes through the at least one heater positioned external to the reactor and operable to transfer heat from the heat carrier to the carbon black-yielding feedstock. The at least one heater can be at least partially (or fully) heat sourced with carbon black tail gas (e.g., heat from the tail gas or heat generated by burning tail gas) from the carbon black reactor or a different carbon black reactor(s) or both, to heat the carbon black-yielding feedstock. The preheat can be partially or fully achieved using one or more plasma heaters or other heaters or heat sources.

The introducing of the heated gas stream into the reactor can include plasma heating a plasma-heatable gas stream in a plasma heater to provide at least a portion of the heated gas stream.

In the present invention, a non-catalytic surface can be used on some or all of the carbon black-yielding feedstock contacting walls of the at least one heater and/or inner walls of at least one feedstock supply line that supplies the preheated carbon black-yielding feedstock to the carbon black reactor(s). The surface can be non-catalytic to cracking (e.g., thermal cracking) or polymerization of hydrocarbons.

In the present invention, the supplying step can include or be the feeding of the preheated carbon black-yielding feedstock through at least one feedstock supply line that supplies to the carbon black reactor(s), and the method further can optionally include periodically feeding a purge gas(es) that can be an oxidant for carbon through the at least one carbon black-yielding feedstock supply line(s). The feedstock supply line exiting the at least one heater that preheats the feedstock can have a cross-sectional area (e.g., diameter) that is the same or different from the supply line that feeds the feedstock into the at least one heater (e.g., can have a smaller or larger cross-sectional area).

In the present invention, the supplying can include feeding the preheated carbon black-yielding feedstock through at least one feedstock supply line that supplies to the carbon black reactor(s), and the method can include injecting the preheated carbon black yielding feedstock into the carbon black reactor with at least partial (or full) flashing (e.g., feedstock evaporation, for instance, achieved by dropping the pressure) of the carbon black-yielding feedstock.

As indicated, the feedstock can be heated to a temperature of greater than about 300° C., or other temperatures exceeding 500° C. using the present fouling control approaches. The feedstock temperature, due to the present invention's advances, can be, for example, at least 310° C., at least 350° C., at least 375° C., at least 400° C., at least 425° C., at least about 450° C., or at least about 500° C., or at least about 550° C., or at least about 600° C., or at least about 650° C., or at least about 700° C., or at least about 750° C., or at least about 800° C., at least 850° C., or from about 305° C. to about 850° C., or from about 350° C. to about 850° C., or from about 450° C. to about 750° C., or from about 450° C. to about 700° C., or from about 500° C. to about 750° C., or from about 500° C. to about 700° C. This feedstock temperature is the temperature of the carbon black forming feedstock just after exiting the heater(s) used to preheat the feedstock and/or just prior to being introduced into the carbon black reactor. The feedstock temperature in this respect can be measured or sensed at one or more points along the feedstock supply line from the point at which the feedstock temperature has been raised to a value exceeding about 300° C. to the discharge end of the supply line where feedstock in introduced to the reactor. This feedstock supply line includes any length of tubing within a feedstock heater at and after which the feedstock temperature has been raised to a value exceeding about 300° C. and before transport in an additional supply line portion extending from the feedstock heater to the reactor. As an option, the pre-heated feedstock temperature can have an absolute minimum value in the pre-heated feedstock supply line of no less than 301° C., and/or as an option, a maximum variability of the temperature in the pre-heated feedstock supply line can be, for example, ±20%, or ±10%, or ±5%, or ±2.5%, or ±1%, or ±0.5%, considering all points along the feedstock supply line. These indicated feedstock temperatures can be used in combination with the various fouling control process variables indicated herein.

Fouling control using the stated feedstock velocity, at least in part, can include feeding the feedstock(s) at this velocity to the heater and/or through the heater that preheats the feedstock and/or through the feedstock supply line to the reactor. The velocity can be, for example, at least about 0.2 m/sec, or at least about 0.5 m/sec, or at least about 1 m/sec, or at least about 1.6 m/sec, or at least about 2 m/sec, or at least about 3 m/sec, or from about 0.2 m/sec to about 10 m/sec, or from about 1 m/sec to about 7 m/sec, or from about 1.5 m/sec to 3 m/sec, or from about 2 m/sec to about 6 m/sec, or from about 3 m/sec to about 5 m/sec. The feedstock velocity is a linear velocity relative to longitudinal axis of the pipe or other supply line structure. The feedstock velocity (first velocity) is measured at the point of being introduced into the heater that preheats the feedstock. The feedstock velocity through the heater(s) and/or after exiting the heater(s) can be the same or different from the first velocity and for instance can be greater (e.g., at least 1% greater, at least 2% greater, at least 3% greater, at least 5% greater, at least 7% greater, at least 10% greater, at least 100% greater, at least 200% greater, such as from 1% to 300% greater or from 50% to 200% greater and the like). The velocity is measured or calculated based on a feedstock density measured at 60° C. at 1 atm and based on the smallest cross-sectional area present in the feedstock line being measured. This feedstock supply line can include any length of tubing within a feedstock heater at and/or after which the feedstock temperature has been raised to a value exceeding about 300° C. and before transport in an additional supply line portion extending from the feedstock heater to the reactor. For example, the feedstock velocity can have an absolute minimum value in the feedstock supply line of no less than 0.2 m/sec, and/or as an option, a maximum variability of the feedstock velocity in the feedstock supply line can be, for example, ±20%, or ±10%, or ±5%, or ±1%, or ±0.5%, considering all points along the feedstock supply line.

Fouling control using feedstock pressurization, at least in part, can include pressurizing the carbon black-yielding feedstock, for example, to a pressure greater than about 10 bar, or greater than about 20 bar, or greater than about 30 bar, or greater than about 40 bar, or greater than about 50 bar, or from about 10 to about 180 bar, or from about 20 to about 180 bar, or from about 40 to about 180 bar, or from about 50 to about 180 bar or more. The feedstock pressures herein are given as absolute pressures. The pressure (first pressure) is the pressure measured at the point prior to introduction into the heater to pre-heat. The pressure through the heater(s) that preheats the feedstock and/or afterwards to the introduction point(s) to the reactor can be the same or different from the first pressure, such as lower than the first pressure (e.g., at least 1% lower, at least 2% lower, at least 3% lower, at least 5% lower, at least 7% lower, at least 10% lower, at least 15% lower, at least 20% lower, such as from 1% to 25% lower or from 3% to 20% lower and the like). The Gauge pressure measurements should be adjusted to absolute values in a known manner for making comparisons to the ranges shown herein. The feedstock pressure can be measured or sensed at one or more points along the feedstock supply line from the point at which the feedstock temperature has been raised to a value exceeding about 300° C. to the discharge end of the supply line where feedstock in introduced to the reactor. This feedstock supply line can include any length of tubing within a feedstock heater at and after which the feedstock temperature has been raised to a value exceeding about 300° C. and before transport in an additional supply line portion extending from the feedstock heater to the reactor. The pressure can directly trend with feedstock temperature for fouling control. For example, a feedstock pressure of 10 bar may be adequate to control fouling at a feedstock temperature of 300° C., whereas an increased pressure of more than 10 bar, such as 20 bar or more, may be more useful to provide the same level of fouling control if the feedstock temperature is increased to 500° C., all other things the same.

Fouling control using a low total feedstock residence time can be used. The total feedstock residence time can be the combined time spent in the at least one heater for preheating including the time that the preheated carbon black-yielding feedstock spends before introduction to the reactor. The total residence time can be, for example, less than about 120 minutes, or less than about 90 minutes, or less than about 60 minutes, or less than about 45 minutes, or less than about 30 minutes, or less than 15 minutes, or less than 10 minutes, or less than 5 minutes, or less than 4 minutes, or less than 3 minutes, or less than 2 minutes, or less than 1 minute, or less than 30 seconds, or less than 15 seconds, or from about 1/60 minute to about 120 minutes, or from about 0.5 minute to about 120 minutes, or from about 1 minute to about 90 minutes, or from about 2 minutes to about 60 minutes, or from about 3 minutes to about 45 minutes, or from about 4 minutes to about 30 minutes, or from 5 to 30 minutes, or from 5 to 40 minutes, or from 10 to 30 minutes, or from about 5 minutes to about 15 minutes. The residence time can be an average value or a maximum value or a minimum value. The feedstock residence time can be determined from the point at which the feedstock temperature has been raised to a value exceeding about 300° C. to the point where feedstock is introduced to the reactor. Residence time can inversely trend with feedstock temperature. For example, a feedstock residence time of up to about 120 minutes may be tolerated without fouling problems at a feedstock temperature of 310° C., whereas the residence time can preferably be reduced to less than 120 minutes to provide the same level of fouling control if the feedstock temperature is increased to 500° C., all other things the same.

Fouling control during preheating of the feedstock, for instance, in a feedstock heater, can include use of a heater operating at an average heat flux, for example, of greater than about 10 kW/m$^2$, or greater than about 20 kW/m$^2$, or greater than about 30 kW/m$^2$, or greater than about 50 kW/m$^2$, or greater than about 100 kW/m$^2$, or from about 10 kW/m$^2$ to about 150 kW/m$^2$ (or more), or from about 20 to about 150 kW/m$^2$, or from about 30 to about 100 kW/m$^2$, or from about 40 to about 75 kW/m$^2$, or from about 50 to about 70 kW/m$^2$. Operation at a higher heat flux can be seen as a fouling control measure, because the higher heat flux results in the carbon black-yielding feedstock to heat up faster and/or permits a shorter residence time in the heater since less time is needed to reach the targeted preheat temperature.

Fouling control using a non-catalytic surface to cracking (e.g., thermal cracking) and/or polymerization of hydrocarbons on feedstock-contacting inner walls of the feedstock supply line, at least in part, can include, for example, one or more layer(s) of protective lining, such as a ceramic lining (e.g., silica, alumina, chromium oxide).

Fouling control using periodic on-line feeding of a purge gas through the feedstock supply line can include injecting an oxidant for carbon (e.g., $CO_2$, oxygen, steam, steam and air mixtures) into the feedstock supply line at an accessible point or points along the feedstock line. The purge gas can be introduced at a temperature of 150° C. or higher or exceeding 300° C. downstream of any liquid feedstock pumping means. The steam velocity through the purge line can be, for example, at least about 6 m/sec. Any deadlegs of feedstock can be eliminated so that the purge immediately blows all of the feedstock into the reactor. The purge gas can be introduced upstream of a feedstock heater to further ensure all supply lines exposed to process temperatures exceeding 300° C. are treated.

As indicated, fouling control by coke removal from the feedstock lines can include, for example, spalling or mechanical scraping. Spalling, for example, can involve cooling a coke-coated on-line pipe so that at least some of the coke deposited on the inside of the pipe flakes off or otherwise breaks free from the internal pipe walls as the pipe contracts in size during cooling. The loosened coke can be flushed out of the pipe, and the spalled pipe is ready for use again. During spalling, the feedstock may be diverted from the pipe to be spalled, such as using valving, through an alternate on-line feedline or feedlines to the reactor provided on the apparatus. Once cleaned, the spalled pipe is ready for use again. Another method of cleaning deposited coke out of the feedstock pipes can involve moving a mechanical scraper through the pipe to mechanically remove the coke from the inside of the pipes. During mechanical scraping, the feedstock may be diverted, such as using valving, through an alternate on-line feedline or feedlines to the reactor provided on the apparatus, during the time the pipe taken off-line for cleaning is temporarily out of service. Spalling and/or mechanical scraping, if used, can be performed periodically on the feedstock supply lines.

Referring to FIG. 1, there is shown a furnace 1 which is comprised of 5 zones, a primary combustion zone 10, a transition zone 13, a first reaction zone 31, a throat zone 33, and a second reaction zone 35 into which quench probe 41 is placed to terminate the carbon black forming reaction.

Combustion zone 10 is defined by upstream wall 6 and side wall 4, and terminates at point 12 which is the beginning of transition zone 13. Through wall 6 is inserted conduit 8 through which fuel is introduced into combustion zone 10. Through side wall 4 is inserted conduit 5 through which an oxidant is introduced into combustion zone 10. Contained within combustion zone 10 is flame holder 11 which is attached to pipe 3 which is inserted into combustion zone 10 through orifice 7 in wall 6. Downstream of and connected to combustion zone 10 is transition zone 13 which is defined by wall 17 which begins at point 12 and terminates at point 14. Circumferentially located around wall 17 are a plurality of substantially radially oriented, orifices 21 (or jet nozzles 21) through which the fluid-feedstock mixture 87 may be injected into transition zone 13. FIG. 1 also shows extender fluid 85 being combined with feedstock 83 to form the fluid-feedstock mixture 87 prior to being introduced (e.g., injected) through one or more orifices 21 (or jet nozzles 21).

Downstream of and connected to transition zone 13 is first reaction zone 31 which is defined by wall 37. Zone 31 can be of variable length and width depending upon the reaction conditions desired. The interior cross-sectional area of first reaction zone 31 can be larger than that of transition zone 13. Preferably, the ratio of the internal cross-sectional area of the first reaction zone to that of the transition zone is between 1.1 and 4.0. Wall 37 then converges at a 45° angle relative to the center line of furnace 1 and leads into wall 38 at point 32. Wall 38 defines throat zone 33. The internal cross-sectional area of throat zone 33 is less than the internal cross-sectional area of transition zone 13. Preferably, the ratio of the internal cross-sectional area of throat zone 33 to the internal cross-sectional area of transition zone 13 is between about 0.25 and 0.9. The downstream end 34 of wall 38 leads into wall 39. Wall 39 diverges at a 30 degree angle relative to the center line of furnace 1 and defines second reaction zone 35. The internal cross-sectional area of second reaction zone 35 is larger than the internal cross-sectional area of throat zone 33. Preferably the ratio of the internal cross-sectional area of second reaction zone 35 to that of transition zone 13 is between about 1.1 and 16.0. Through wall 39 into second reaction zone 35 is placed quench probe 41 through which a quench medium such as water may be injected in order to terminate the carbon black forming reaction.

Figure 2:
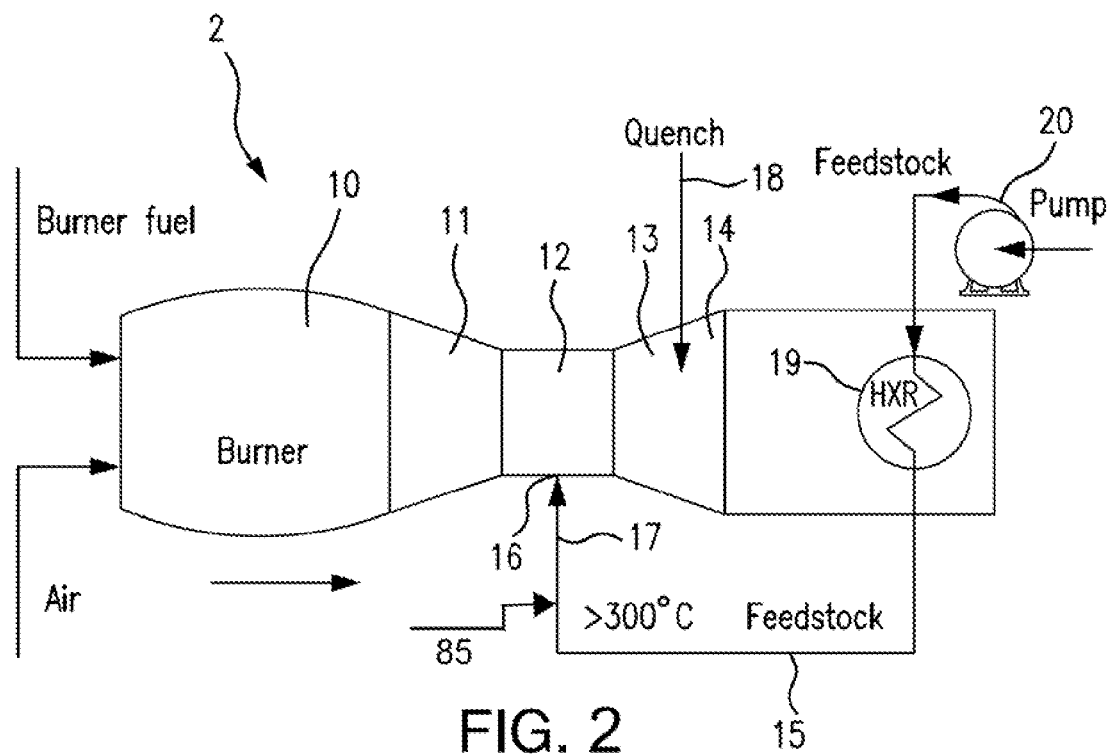

As shown in FIGS. 2-5, at least one extender fluid 85 is combined with carbon black yielding feedstock 15 to form the fluid-feedstock mixture 17 prior to its introduction into the reactor 2, such as in the transition zone 12. As shown in FIG. 2, the carbon black-yielding feedstock 15 is preheated to a temperature of greater than about 300° C. before it is combined with extender fluid 85 and then introduced into the reactor 2 as a fluid-feedstock mixture 17. The preheated carbon black-yielding feedstock is supplied in at least one fluid-feedstock mixture supply line 17 to the at least one feedstock introduction point 16 to the reactor 2. Upon introduction, the feedstock combines with the heated gas stream for forming a reaction stream in which carbon black is formed in the reactor. The carbon black in the reaction stream can be quenched in one or more zones. For example, at quench location 18 of quench zone 14, quenching fluid is injected, which can include water, and which can be used to completely or essentially completely stop pyrolysis of the carbon black-yielding feedstock, or only partially cool the feedstock without stopping pyrolysis followed by a secondary quench (not shown) used to stop pyrolysis of the carbon black-yielding feedstock.

As also shown in FIG. 2, the feedstock heater can include a heat exchanger 19 (HXR), which can have heater walls (not shown), such as used in known heat exchanger designs, heated by the reaction stream on a first side thereof and contacting feedstock on an opposite side thereof before the feedstock is supplied to the at least one feedstock supply line. As indicated, the feedstock is heated in the heat exchanger to a temperature greater than about 300° C. Although shown arranged downstream of a quencher, the feedstock heat exchanger may be located upstream of the quencher in the reaction stream, provided the heater has a construction that can tolerate and operate at higher pre-quench temperatures within the reactor. The feedstock heater can be arranged to be in physical contact with at least a portion of the reactor, e.g., as a coil or tubing housed inside and or against and in contact with a heated wall or walls of the reactor, to heat the feedstock to a temperature greater than about 300° C. Though not shown in FIG. 2, the heat exchanger can optionally heat the feedstock to an intermediate temperature (e.g., above 250° C. or 50° C. to 350° C., or other temperatures below the goal preheated temperature) or be used to get the pre-heat temperature above 300° C., and then a further heat exchanger or heater external or internal to the reactor can be used to heat to the final pre-heat temperature.

The reaction stream within the reactor can have a temperature at quench, for example, of from about 600° C. to about 2000° C., or from about 800° C. to about 1800° C., or from about 1000° C. to about 1500° C., or other high temperatures reflecting an extreme exothermic reaction that is generated in the furnace reactor. The present invention can provide feedstock heat exchange with the high exothermic heat generated by the reactions in the reactor without fouling problems arising in the feedstock supply lines. The present invention thus can make it feasible to improve energy recovery and save raw materials costs as compared to conventional carbon black production operating at much lower feedstock temperatures.

As also shown in FIG. 2, at least one pump 20 can be installed in-line on the feedstock line upstream from the feedstock heater 19 used to raise the feedstock temperature to a value exceeding 300° C. The pump can be used to pressurize the feedstock before it enters the feedstock heater. In that manner, the feedstock can be already pressurized at the time the feedstock temperature is increased to elevated values where fouling problems in the feedstock supply line otherwise could arise in the absence of the pressurization or other indicated fouling control approaches. As the feedstock usually can experience a pressure drop during passage through the feedstock heater under normal operating conditions (e.g., a pressure drop of 0 to about 20 bar), depending, for example, on the heat exchanger design and mode of operation, any pressurization applied to the feedstock as a fouling control measure should compensate for any pressure drop that may occur or be expected to occur in a feedstock heat exchanger, as well as any other pressure drop that occurs or can be expected to occur in the supply line pipes or other conduits used to transport the preheated feedstock to the reactor, particularly if necessary to maintain the feedstock pressure within a pre-targeted range value. Although only a single feedstock supply line and feedstock injection point on the reactor is illustrated in FIG. 2, and in other figures herein, for sake of simplifying the illustrations, it is understood that multiple feedstock supply lines and injection points on the reactor can be used to which the indicated fouling controls also can be applied.

After the mixture of hot combustion gases and carbon black-yielding feedstock is quenched, the cooled gases pass downstream into any conventional cooling and separating steps whereby the carbon black is recovered. The separation of the carbon black from the gas stream can be readily accomplished by conventional devices such as a precipitator, cyclone separator or bag filter. With respect to completely quenching the reactions to form the final carbon black product, any conventional process to quench the reaction downstream of the introduction of the carbon black yielding feedstock can be used and is known to those skilled in the art. For instance, a quenching fluid can be injected which may be water or other suitable fluids to stop the chemical reaction.

Figure 3:
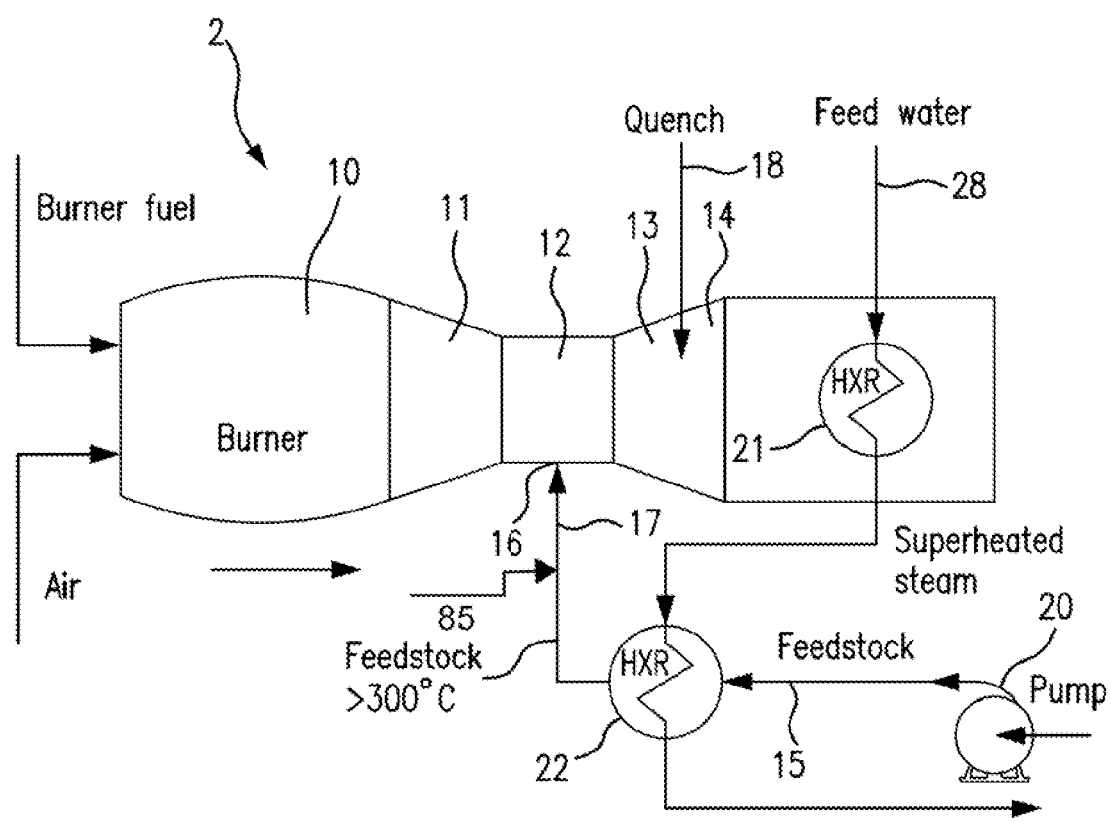

FIG. 3 shows a portion of another type of furnace carbon black reactor which may be used in a process of the present invention to produce carbon blacks wherein at least a portion of the preheating includes contacting a heat exchanger 21 with the reaction stream in the reactor wherein a flowable heat medium or carrier 28, such as steam or nitrogen, flowing through the heat exchanger is heated in the reactor, and the heated steam (e.g., superheated steam) then passes out of the heat exchanger and reactor and is piped through a separate feedstock heater 22 positioned external to the reactor where operable to exchange heat with the feedstock in the feedstock heater to heat the feedstock to a temperature greater than about 300° C., such as 370° C. or greater.

Figure 4:
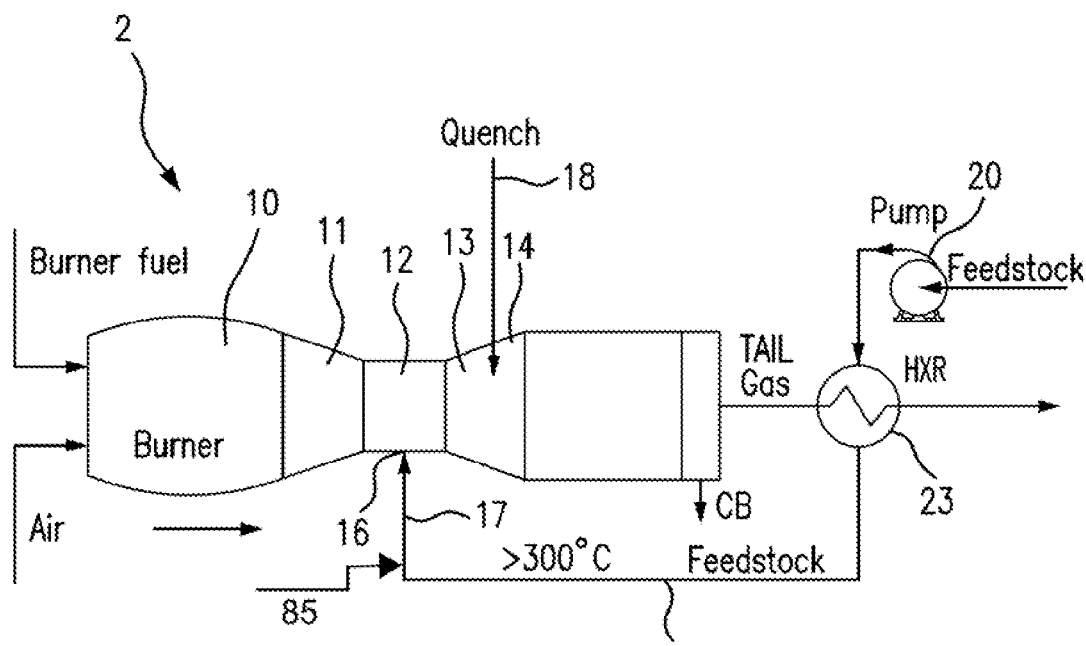

FIG. 4 shows a portion of another type of furnace carbon black reactor which may be used in a process of the present invention to produce carbon blacks wherein at least a portion of the preheating includes contacting a feedstock heater 23 with tail gas that has exited the reactor to heat the feedstock in the feedstock heater to a temperature greater than about 300° C. (or at least partly to the goal temperature).

Figure 5:
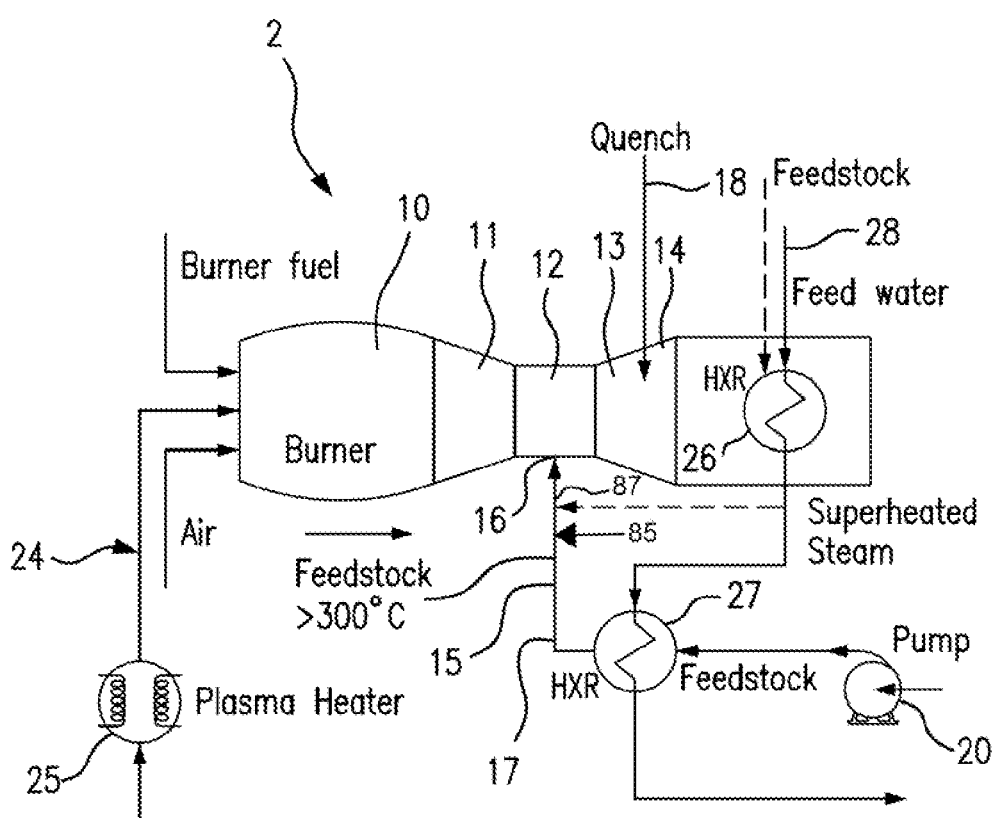

FIG. 5 shows another type of furnace carbon black reactor which may be used in a process of the present invention wherein the heated gas stream further includes at least in part or completely a heated gas 24 that has been heated at least in part or completely using a plasma heater 25. Plasma heating of the gas can be accomplished, for example, in accordance with methods known to those skilled in the art. A plasma torch can be used, for example, such as shown in U.S. Pat. No. 5,486,674, the entire disclosure of which is hereby incorporated by reference, and reference can be made to plasma heating shown in U.S. Pat. Nos. 4,101,639 and 3,288,696, the entire disclosures are hereby incorporated by reference.

As also shown in FIG. 5, the feedstock can be indirectly heated by a heat medium (e.g., steam) that has exchanged heat with the reaction stream in heat exchanger 26 in the reactor, or, alternatively, the feedstock can be directly heated in heat exchanger 26 in the reactor as shown by the hatched lines.

As shown in FIG. 7, the feedstock (FS) can be introduced separately from the extender fluid using a piping design that has an annulus. The "primary fire" in FIG. 7 and FIG. 8 is a reference to the combustion stream. FIG. 8 shows a design where the carbon black feedstock (FS) is separately introduced from the extender fluid in a design where the piping is side by side.

The heat exchanger design used for preheating the feedstock, in or outside the reactor, in these various process schemes of the present invention may have any conventional heat exchanger design, such as shell and tube, shell and coil, plate and frame, and the like. Where the heat exchanger has an inline coil configuration, schedule 80 pipe and elbows can be used, for example, for the inline coil to prevent corrosion/erosion problems. Also, a constant pitch between tubes can be used in constructing the inline coil piping and the coil can use the entire cross section of the flue gas header. Heat transfer coefficients for inline coils may vary significantly for different grades and different plants.

Also, any of the feedstocks for the described process schemes and methods can contain additional materials or compositions which are commonly used to make conventional carbon black. The method of the present invention can further include introducing at least one substance that is or that contains at least one Group IA and/or Group IIA element (or ion thereof) of the Periodic Table. The substance containing at least one Group IA and/or Group IIA element (or ion thereof) contains at least one alkali metal or alkaline earth metal. Examples include lithium, sodium, potassium, rubidium, cesium, francium, calcium, barium, strontium, or radium, or combinations thereof. Any mixtures of one or more of these components can be present in the substance. The substance can be a solid, solution, dispersion, gas, or any combinations thereof. More than one substance having the same or different Group IA and/or Group IIA metal (or ion thereof) can be used. If multiple substances are used, the substances can be added together, separately, sequentially, or in different reaction locations. For purposes of the present invention, the substance can be the metal (or metal ion) itself, a compound containing one or more of these elements, including a salt containing one or more of these elements, and the like. The substance can be capable of introducing a metal or metal ion into the reaction that is ongoing to form the carbon black product. For purposes of the present invention, the substance containing at least one Group IA and/or IIA metal (or ion thereof), if used, can be introduced at any point in the reactor, for example, prior to the complete quenching. For instance, the substance can be added at any point prior to the complete quenching, including prior to the introduction of the carbon black yielding feedstock in a first reaction stage; during the introduction of the carbon black yielding feedstock in a first reaction stage; after the introduction of the carbon black yielding feedstock in a first reaction stage; prior to, during, or immediately after the introduction of any second carbon black yielding feedstock; or any step after the introduction of a second carbon black yielding feedstock but prior to the complete quenching. More than one point of introduction of the substance can be used.

Additionally, in the present invention, as stated earlier, the present invention relates to a method for controlling at least one particle property of a carbon black. This method involves combining at least one extender fluid with at least one carbon black feedstock (before and/or after entering the reactor) to form a fluid-feedstock mixture. The method further can include supplying the fluid-feedstock mixture into a carbon black reactor or separately supplying the extender fluid and feedstock into the reactor. The supplying of the fluid-feedstock mixtures can be in the form of one or more jets. The method involves controlling the amount of extender fluid present in the fluid-feedstock mixture in order to control at least one particle property. The reference to "extender fluid", "carbon black feedstock", and "fluid-feedstock mixture" have the same meaning as these terms have been defined and explained above.

One example of at least one particle property is tint. The particle property can be a surface area property or structure property.

The present invention will be further clarified by the following examples, which are intended to be exemplary of the present invention.

EXAMPLES

Example 1

In one example of the present invention, a high velocity (over 200 m/s) stream of hot gas from a natural gas flame was fired into a transition zone (D=135 mm) of a carbon black reactor, such as that shown in FIG. 1, at an equivalence ratio of 0.8. Decant feedstock was injected in the transition using four injectors at an overall equivalence ratio of 3.33. The feedstock injectors each had an orifice of 0.76 mm followed by an expansion section 76 mm long and 6.5 mm in diameter. The feedstock was preheated to about 500° C. prior to entering the injectors. Nitrogen was added to the feedstock as an extender fluid at flow rates between 0 wt % and 20 wt % (see Table below) of the feedstock flow immediately downstream of the orifice. The nitrogen was added in such a way that it was mixed with the feedstock prior to entering the transition.

The penetration of the fluid-feedstock jets into the transition zone was observed visually by means of an observation port in the reactor. With no extender fluid, the feedstock jets only penetrated the cross-flow of the high velocity stream of hot gas to a depth equal to ~25% of the transition diameter (i.e., a jet penetration of about 34 mm). As extender fluid was added to the feedstock, the fluid-feedstock jet penetration increased continuously until opposing fluid-feedstock jets were touching in the center of the transition (i.e., a jet penetration of about 68 mm). This was observed to occur at 20 wt % nitrogen flow, on an injected feedstock weight basis. In addition, the tint value of the carbon black was measured by the ASTM D3265 method and found to increase for a given carbon black surface area as more nitrogen was added to the feedstock in the fluid-feedstock mixture. The Table below shows how tint and jet penetration changed with nitrogen flow rate.

TABLE 1

| $N_2$ flow (wt % of feedstock) | Jet penetration (% of transition diameter) | Tint % (ASTM D3265) |
|---|---|---|
| 0 | 25% | 122 |
| 5 | 35% | 127 |
| 10 | 45% | 130 |
| 20 | >50% (jets touching in center) | 132 |

Example 2

In a second example of the present invention, using the same reactor as in Example 1, nitrogen was added in an annulus (as shown in FIG. 7) around the feedstock jets such that the extender fluid in the annulus and feedstock did not mix prior to entering the transition. The extender fluid was in close proximity to the feedstock such that it increased the momentum of the feedstock jet thereby increasing the fluid-feedstock jet penetration. The same reactor conditions were used as in Example 1 and nitrogen was added in the annulus at flow rates of 0 wt % to 20 wt % of the feedstock flow, on an injected feedstock weight basis. As in the previous example, the feedstock jet penetration was only ~25% of the transition diameter with no fluid flow in the annulus. Jet penetration increased with extender fluid flow in the annulus up to ~40% of the transition diameter at 20 wt % flow, on an injected feedstock weight basis. Thus, adding the extender fluid in this manner increases fluid-feedstock jet penetration but not as effectively as in the previous example. Tint also increased some with the addition of nitrogen in the annulus.

TABLE 2

| N2 flow (wt % of FS) | Jet penetration (% of transition diameter) | Tint (ASTM D3265) |
|---|---|---|
| 0 | ~25% | 122 |
| 5 | ~30% | 123.5 |
| 10 | ~35% | 126 |
| 20 | ~40% | 127.5 |

The present invention includes the following aspects/embodiments/features in any order and/or in any combination:

1. A method for producing carbon black comprising:
   introducing a heated gas stream into a carbon black reactor;
   combining at least one extender fluid with at least one carbon black feedstock to form a fluid-feedstock mixture such that the at least one extender fluid increases the momentum of the at least one carbon black feedstock in a direction that is axial or substantially axial to at least one feedstock introduction point to the carbon black reactor;
   supplying said fluid-feedstock mixture to said at least one feedstock introduction point to the carbon black reactor,
   combining at least said fluid-feedstock mixture through the at least one introduction point to said carbon black reactor with the heated gas stream to form a reaction stream in which carbon black is formed in said carbon black reactor; and
   recovering the carbon black in the reaction stream.
2. The method of any preceding or following embodiment/feature/aspect, wherein said extender fluid is chemically inert to the carbon black feedstock.
3. The method of any preceding or following embodiment/feature/aspect, wherein said extender fluid is uniformly distributed in said carbon black feedstock.
4. The method of any preceding or following embodiment/feature/aspect, wherein said supplying of the fluid-feedstock mixture is in the form of one or more jets, and the one or more jets of fluid-feedstock mixture contain sufficient extender fluid to propel the carbon black feedstock into an interior portion of the heated gas stream.
5. The method of any preceding or following embodiment/feature/aspect, wherein said extender fluid is at least one inert gas.
6. The method of any preceding or following embodiment/feature/aspect, wherein said extender fluid is steam, water, air, carbon dioxide, natural gas, carbon monoxide, hydrogen, carbon black tailgas, nitrogen, or any combinations thereof.
7. The method of any preceding or following embodiment/feature/aspect, wherein said extender fluid is nitrogen.
8. The method of any preceding or following embodiment/feature/aspect, wherein said extender fluid is introduced into said carbon black feedstock at a pressure sufficient to penetrate into said carbon black feedstock to form said fluid-feedstock mixture.
9. The method of any preceding or following embodiment/feature/aspect, wherein said extender fluid is introduced into said carbon black feedstock at a pressure of from about 1 lb/in$^2$ to about 350 lb/in$^2$ to form said fluid-feedstock mixture.
10. The method of any preceding or following embodiment/feature/aspect, wherein said carbon black feedstock is atomized prior to said combining with said extender fluid.
11. The method of any preceding or following embodiment/feature/aspect, wherein the amount of said extender fluid that is combined with said carbon black feedstock is adjustable during continuous carbon black production.
12. The method of any preceding or following embodiment/feature/aspect, wherein said supplying of the fluid-feedstock mixture is in the form of one or more jets and jet penetration of the fluid-feedstock mixture into said heated gas stream is adjusted by altering the extender fluid content of the fluid-feedstock mixture during continuous carbon black production.
13. The method of any preceding or following embodiment/feature/aspect, wherein said extender fluid is at least partially distributed in said carbon black feedstock.
14. The method of any preceding or following embodiment/feature/aspect, wherein said extender fluid is present in said fluid-feedstock mixture in an amount of from about 0.1 wt % to about 400 wt %, based on the weight of the carbon black feedstock.
15. The method of any preceding or following embodiment/feature/aspect, further comprising heating said carbon black feedstock prior to combining with said extender fluid to form said fluid-feedstock mixture.
16. The method of any preceding or following embodiment/feature/aspect, further comprising heating said carbon black feedstock to a temperature of greater than about 300° C. prior to combining with said extender fluid to form said fluid-feedstock mixture.
17. The method of any preceding or following embodiment/feature/aspect, further comprising heating said carbon black feedstock to a temperature of from about 360° C. to about 850° C. prior to combining with said extender fluid to form said fluid-feedstock mixture.
18. The method of any preceding or following embodiment/feature/aspect, further comprising heating said carbon black feedstock to a first temperature of from about 300° C. to about 850° C. prior to combining with said extender fluid to form said fluid-feedstock mixture, and then heating said fluid-feedstock mixture to a second temperature that is higher than said first temperature, where each of said heating steps occurs prior to introduction into said carbon black reactor.
19. The method of any preceding or following embodiment/feature/aspect, further comprising heating said carbon black feedstock to a first temperature of from about 400° C. to about 600° C. prior to combining with said extender fluid to form said fluid-feedstock mixture, and then heating said fluid-feedstock mixture to a second temperature that is higher than said first temperature by at least 50° C., where each of said heating steps occurs prior to introduction into said carbon black reactor.
20. The method of any preceding or following embodiment/feature/aspect, further comprising heating said carbon black feedstock to a first temperature of from about 400° C. to about 600° C. prior to combining with said extender fluid to form said fluid-feedstock mixture, and then heating said fluid-feedstock mixture to a second temperature that is higher than said first temperature by at least 100° C., where each of said heating steps occurs prior to introduction into said carbon black reactor.
21. The method of any preceding or following embodiment/feature/aspect, further comprising heating said carbon black feedstock to a first temperature prior to combining with said extender fluid to form said fluid-feedstock mixture, and then heating said fluid-feedstock mixture to a second temperature that is higher than said first temperature and up to about 950° C., where each of said heating steps occurs prior to introduction into said carbon black reactor.

22. The method of any preceding or following embodiment/feature/aspect, wherein extender fluid adjustments are made to control choke flow velocity or critical velocity or both, of the one or more jets of the fluid-feedstock mixture, thereby altering penetration of the fluid-feedstock mixture into the heated gas stream.

23. A method for controlling at least one particle property of a carbon black comprising:
combining at least one extender fluid with at least one carbon black feedstock to form a fluid-feedstock mixture and supplying said fluid-feedstock mixture into a carbon black reactor; and wherein said supplying of the fluid-feedstock mixture is in the form of one or more jets and controlling the amount of extender fluid present in said fluid-feedstock mixture to control said at least one particle property.

24. The method of any preceding or following embodiment/feature/aspect, wherein said at least one particle property is tint.

25. The method of any preceding or following embodiment/feature/aspect, wherein said extender fluid is chemically inert to the carbon black feedstock.

26. The method of any preceding or following embodiment/feature/aspect, wherein said extender fluid is uniformly distributed in said carbon black feedstock.

27. The method of any preceding or following embodiment/feature/aspect, wherein said supplying of the fluid-feedstock mixture is in the form of one or more jets, and the one or more jets of fluid-feedstock mixture contain sufficient extender fluid to propel the carbon black feedstock into an interior portion of the heated gas stream.

28. The method of any preceding or following embodiment/feature/aspect, wherein said extender fluid is at least one inert gas.

29. The method of any preceding or following embodiment/feature/aspect, wherein said extender fluid is steam, water, air, carbon dioxide, natural gas, carbon monoxide, hydrogen, carbon black tailgas, nitrogen, or any combinations thereof.

30. The method of any preceding or following embodiment/feature/aspect, wherein said extender fluid is nitrogen.

31. The method of any preceding or following embodiment/feature/aspect, wherein said extender fluid is introduced into said carbon black feedstock at a pressure sufficient to penetrate into said carbon black feedstock to form said fluid-feedstock mixture.

32. The method of any preceding or following embodiment/feature/aspect, wherein said extender fluid is introduced into said carbon black feedstock at a pressure of from about 1 lb/in$^2$ to about 350 lb/in$^2$ to form said fluid-feedstock mixture.

33. The method of any preceding or following embodiment/feature/aspect, wherein the amount of said extender fluid that is combined with said carbon black feedstock is adjustable while said method is producing carbon black.

34. The method of any preceding or following embodiment/feature/aspect, wherein the amount of said extender fluid that is combined with said carbon black feedstock is adjustable during continuous carbon black production.

35. The method of any preceding or following embodiment/feature/aspect, wherein said supplying of the fluid-feedstock mixture is in the form of one or more jets and jet penetration of the fluid-feedstock mixture into said heated gas stream is adjusted by altering the extender fluid content of the fluid-feedstock mixture during continuous carbon black production.

36. The method of any preceding or following embodiment/feature/aspect, wherein said extender fluid is present in said fluid-feedstock mixture in an amount of from about 0.1 wt % to about 400 wt %, based on the weight of the carbon black feedstock.

37. The method of any preceding or following embodiment/feature/aspect, wherein said extender fluid is present in said fluid-feedstock mixture in an amount of from about 0.1 wt % to about 50 wt %, based on the weight of the carbon black feedstock.

38. The method of any preceding or following embodiment/feature/aspect, further comprising heating said carbon black feedstock prior to combining with said extender fluid to form said fluid-feedstock mixture.

39. The method of any preceding or following embodiment/feature/aspect, further comprising heating said carbon black feedstock to a temperature of greater than about 300° C. prior to combining with said extender fluid to form said fluid-feedstock mixture.

40. The method of any preceding or following embodiment/feature/aspect, further comprising heating said carbon black feedstock to a temperature of from about 360° C. to about 850° C. prior to combining with said extender fluid to form said fluid-feedstock mixture.

41. The method of any preceding or following embodiment/feature/aspect, further comprising heating said carbon black feedstock to a first temperature of from about 300° C. to about 850° C. prior to combining with said extender fluid to form said fluid-feedstock mixture, and then heating said fluid-feedstock mixture to a second temperature that is higher than said first temperature, where each of said heating steps occurs prior to introduction into said carbon black reactor.

42. The method of any preceding or following embodiment/feature/aspect, further comprising heating said carbon black feedstock to a first temperature of from about 400° C. to about 600° C. prior to combining with said extender fluid to form said fluid-feedstock mixture, and then heating said fluid-feedstock mixture to a second temperature that is higher than said first temperature by at least 50° C., where each of said heating steps occurs prior to introduction into said carbon black reactor.

43. The method of any preceding or following embodiment/feature/aspect, further comprising heating said carbon black feedstock to a first temperature of from about 400° C. to about 600° C. prior to combining with said extender fluid to form said fluid-feedstock mixture, and then heating said fluid-feedstock mixture to a second temperature that is higher than said first temperature by at least 100° C. where each of said heating steps occurs prior to introduction into said carbon black reactor.

44. The method of any preceding or following embodiment/feature/aspect, further comprising heating said carbon black feedstock to a first temperature prior to combining with said extender fluid to form said fluid-feedstock mixture, and then heating said fluid-feedstock mixture to a second temperature that is higher than said first temperature and up to about 950° C., where each of said heating steps occurs prior to introduction into said carbon black reactor.

45. The method of any preceding or following embodiment/feature/aspect, wherein the jet penetration is adjusted by the extender fluid affecting choke flow velocity or critical velocity or both, of the one or more jets of the fluid-feedstock mixture.

46. A method for producing carbon black comprising:
introducing a heated gas stream into a carbon black reactor;
supplying at least one carbon black feedstock to at least one feedstock introduction point to the carbon black reactor;
supplying at least one extender fluid to at least one introduction point to the carbon black reactor wherein the at least one introduction point for the extender fluid is located such that the at least one extender fluid increases the momentum of the at least one carbon black feedstock as the carbon black feedstock impacts the heated gas stream;
combining said at least one carbon black feedstock and said at least one extender fluid, with the heated gas stream to form a reaction stream in which carbon black is formed in said carbon black reactor; and
recovering the carbon black in the reaction stream.

47. The method of any preceding or following embodiment/feature/aspect, wherein said extender fluid is inert to the carbon black feedstock.

48. The method of any preceding or following embodiment/feature/aspect, wherein said extender fluid is distributed in said carbon black feedstock.

49. The method of any preceding or following embodiment/feature/aspect, wherein said supplying of the carbon black feedstock and the supplying of the extender fluid is in the form of one or more jets, each jet having central hollow tip with a shealth annulus that introduces said extender fluid.

50. The method of any preceding or following embodiment/feature/aspect, wherein said supplying of the carbon black feedstock and the supplying of the extender fluid is in the form of a pair of one or more jets adjacent to each other, wherein one jet in each pair supplies said carbon black feedstock and the other jet in each pair supplies said extender fluid.

51. The method of any preceding or following embodiment/feature/aspect, wherein said extender fluid is introduced at a pressure sufficient to penetrate into said carbon black feedstock.

52. The method of any preceding or following embodiment/feature/aspect, further comprising heating said carbon black feedstock to a temperature of greater than about 300° C. prior to supplying to said at least one introduction point.

53. The method of any preceding or following embodiment/feature/aspect, further comprising heating said carbon black feedstock to a temperature of from about 360° C. to about 850° C. prior to supplying to said at least one introduction point.

54. A method for controlling at least one particle property of a carbon black comprising:
separately supplying a) at least one extender fluid adjacent to b) at least one carbon black feedstock into a carbon black reactor and wherein said supplying of a) and b) is in the form of one or more jets, and controlling the amount of extender fluid present to control said at least one particle property.

55. The method of any preceding or following embodiment/feature/aspect, wherein said at least one particle property is tint.

56. The method of any preceding or following embodiment/feature/aspect, further comprising heating said extender fluid to a first temperature prior to combining with said carbon black feedstock to form said fluid-feedstock mixture.

57. The method of any preceding or following embodiment/feature/aspect, further comprising heating said carbon black feedstock to a first temperature prior to combining with said extender fluid and heating said extender fluid to a second temperature prior to combining with said carbon black feedstock, and then combining to form said fluid-feedstock mixture, and then heating said fluid-feedstock mixture to a third temperature that is higher than said first temperature and up to about 950° C., where each of said heating steps occurs prior to introduction into said carbon black reactor.

58. The method of any preceding or following embodiment/feature/aspect, wherein said at least one particle property is surface area.

59. The method of any preceding or following embodiment/feature/aspect, wherein said carbon black feedstock is atomized prior to said combining with said extender fluid.

60. The method of any preceding or following embodiment/feature/aspect, further comprising heating said carbon black feedstock to a temperature of greater than about 300° C. prior to combining with said extender fluid to form said fluid-feedstock mixture, and wherein said carbon black feedstock is atomized prior to said combining with said extender fluid.

61. The method of any preceding or following embodiment/feature/aspect, wherein said extender fluid is present in said fluid-feedstock mixture in an amount of from about 0.1 wt % to about 50 wt %, based on the weight of the carbon black feedstock.

The present invention can include any combination of these various features or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:
1. A method for producing carbon black comprising:
introducing a heated gas stream into a carbon black reactor to form a flow of gas;
combining at least one extender fluid with at least one carbon black feedstock to form a jet of a fluid-feedstock mixture, wherein the at least one extender fluid is a gas or liquid that increases the momentum of the at least one carbon black feedstock in a direction that is axial or substantially axial to the direction of feedstock flow from at least one feedstock introduction point to the carbon black reactor and wherein degree of penetration of the fluid-feedstock mixture into the flow of gas is adjustable based on amount of extender fluid utilized in said fluid-feedstock mixture;
supplying said fluid-feedstock mixture to said at least one feedstock introduction point to the carbon black reactor, combining at least said fluid-feedstock mixture through the at least one introduction point to said carbon black reactor with the flow of gas such that the fluid-feedstock mixture penetrates into the flow of gas in a direction that is substantially perpendicular to the flow of gas to form a reaction stream in which carbon black is formed in said carbon black reactor; and
recovering the carbon black in the reaction stream.

2. The method of claim 1, wherein said extender fluid is chemically inert to the carbon black feedstock or said extender fluid is uniformly distributed in said carbon black feedstock, or both.

3. The method of claim 1, further comprising heating said carbon black feedstock to a first temperature prior to combining with said extender fluid and heating said extender fluid to a second temperature prior to combining with said carbon black feedstock, and then combining to form said fluid-feedstock mixture, and then heating said fluid-feedstock mixture to a third temperature that is higher than said first temperature and up to about 950° C., where each of said heating steps occurs prior to introduction into said carbon black reactor.

4. The method of claim 1, wherein said supplying of the fluid-feedstock mixture is in the form of one or more jets, and the one or more jets of fluid-feedstock mixture contain sufficient extender fluid to propel the carbon black feedstock into an interior portion of the heated gas stream.

5. The method of claim 4, wherein extender fluid adjustments are made to control choke flow velocity or critical velocity or both, of the one or more jets of the fluid-feedstock mixture, thereby altering penetration of the fluid-feedstock mixture into the heated gas stream.

6. The method of claim 1, wherein said extender fluid is steam, water, air, carbon dioxide, natural gas, carbon monoxide, hydrogen, carbon black tailgas, nitrogen, or any combinations thereof.

7. The method of claim 1, wherein said extender fluid is nitrogen.

8. The method of claim 1, wherein said extender fluid is introduced into said carbon black feedstock at a pressure sufficient to penetrate into said carbon black feedstock to form said fluid-feedstock mixture.

9. The method of claim 1, wherein said extender fluid is introduced into said carbon black feedstock at a pressure of from about 1 lb/in$^2$ to about 350 lb/in$^2$ to form said fluid-feedstock mixture.

10. The method of claim 1, wherein said carbon black feedstock is atomized prior to said combining with said extender fluid.

11. The method of claim 1, wherein said extender fluid is at least one inert gas.

12. The method of claim 1, further comprising heating said extender fluid to a first temperature prior to combining with said carbon black feedstock to form said fluid-feedstock mixture.

13. The method of claim 1, further comprising heating said carbon black feedstock to a first temperature of from about 300° C. to about 850° C. prior to combining with said extender fluid to form said fluid-feedstock mixture, and then heating said fluid-feedstock mixture to a second temperature that is higher than said first temperature, where each of said heating steps occurs prior to introduction into said carbon black reactor.

14. The method of claim 1, wherein said extender fluid is present in said fluid-feedstock mixture in an amount of from about 0.1 wt% to about 400 wt%, based on the weight of the carbon black feedstock.

15. The method of claim 1, further comprising heating said carbon black feedstock to a temperature of greater than about 300° C. prior to combining with said extender fluid to form said fluid-feedstock mixture.

16. A method for controlling at least one particle property of a carbon black comprising:
introducing a heated gas stream into a carbon black reactor to form a flow of gas;
combining at least one extender fluid with at least one carbon black feedstock to form a fluid-feedstock mixture and supplying said fluid-feedstock mixture into a carbon black reactor; and wherein said supplying of the fluid-feedstock mixture is in the form of one or more jets and controlling the amount of extender fluid present in said fluid-feedstock mixture to control said at least one particle property, wherein said extender fluid is a gas or liquid fluid that provides momentum to the carbon black feedstock to form a jet of fluid-feedstock mixture to penetrate the flow of gas.

17. The method of claim 16, wherein said at least one particle property is tint.

18. The method of claim 16, wherein said at least one particle property is surface area.

19. A method for producing carbon black comprising:
introducing a heated gas stream into a carbon black reactor to form a flow of gas;
supplying at least one carbon black feedstock to at least one feedstock introduction point to the carbon black reactor;
supplying at least one extender fluid to at least one introduction point to the carbon black reactor, wherein the at least one extender fluid is a gas or liquid that increases the momentum of the at least one carbon black feedstock as the carbon black feedstock impacts the flow of gas;
combining a) said at least one carbon black feedstock and said at least one extender fluid, with b) the heated gas stream such that the carbon black feedstock with extender fluid penetrates into the flow of gas in a direction that is substantially perpendicular to the flow of gas to form a reaction stream in which carbon black is formed in said carbon black reactor; and
recovering the carbon black in the reaction stream.

20. The method of claim 19, wherein said supplying of the carbon black feedstock and the supplying of the extender fluid is in the form of a pair of one or more jets adjacent to each other, wherein one jet in each pair supplies said carbon black feedstock and the other jet in each pair supplies said extender fluid.

21. The method of claim 19, wherein said extender fluid is introduced at a pressure sufficient to penetrate into said carbon black feedstock.

22. A method for controlling at least one particle property of a carbon black comprising:
introducing a heated gas stream into a carbon black reactor to form a flow of gas;
separately supplying a) at least one extender fluid adjacent to b) at least one carbon black feedstock into a carbon black reactor and wherein said supplying of a) and b) is in the form of one or more jets, and controlling the amount of extender fluid present to control said at least one particle property, wherein said extender fluid is a gas or liquid fluid that provides momentum to the carbon black feedstock to form a jet of fluid-feedstock mixture to penetrate into the flow of gas.

\* \* \* \* \*